United States Patent
Ohki et al.

(10) Patent No.: US 10,134,164 B2
(45) Date of Patent: Nov. 20, 2018

(54) INFORMATION PROCESSING APPARATUS, INFORMATION PROCESSING SYSTEM, INFORMATION PROCESSING METHOD, AND PROGRAM

(71) Applicant: SONY CORPORATION, Tokyo (JP)

(72) Inventors: Yoshihito Ohki, Tokyo (JP); Shoichiro Moriya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/329,805

(22) PCT Filed: Aug. 28, 2015

(86) PCT No.: PCT/JP2015/004356
§ 371 (c)(1),
(2) Date: Jan. 27, 2017

(87) PCT Pub. No.: WO2016/031254
PCT Pub. Date: Mar. 3, 2016

(65) Prior Publication Data
US 2017/0256081 A1     Sep. 7, 2017

(30) Foreign Application Priority Data
Aug. 28, 2014  (JP) .................... 2014-174456

(51) Int. Cl.
*G06K 9/36*   (2006.01)
*G06T 11/60*  (2006.01)
(Continued)

(52) U.S. Cl.
CPC .......... *G06T 11/60* (2013.01); *G06K 9/00255* (2013.01); *G06K 9/4604* (2013.01);
(Continued)

(58) Field of Classification Search
CPC .. G06K 9/00255; G06K 9/4604; G06T 11/60; G06T 7/60; G06T 7/70; G06T 7/90
See application file for complete search history.

(56) References Cited

U.S. PATENT DOCUMENTS

2008/0107331 A1* 5/2008 Kojima ................. G06T 11/001
                                                              382/162

FOREIGN PATENT DOCUMENTS

| JP | 2006-318449 | 11/2006 |
| JP | 2009-268131 | 11/2009 |
| WO | WO2014-097706 A1 | 6/2014 |

* cited by examiner

*Primary Examiner* — Phuoc Tran
(74) *Attorney, Agent, or Firm* — Paratus Law Group, PLLC

(57) ABSTRACT

There is provided an information processing apparatus that is capable of generating image data including the original image data, which reflects the geometric features of the original image data, the information processing apparatus including: an acquisition unit and a generation unit. The acquisition unit acquires geometric feature information extracted by analyzing first image data. The generation unit generates second image data and third image data, the second image data being generated on the basis of the geometric feature information, the third image data including a first area and a second area, corresponding image data being placed in the first area, the corresponding image data corresponding to the first image data, the second image data being placed in the second area.

19 Claims, 13 Drawing Sheets

(51) Int. Cl.
 *H04N 1/387* (2006.01)
 *G06T 7/90* (2017.01)
 *G06T 7/70* (2017.01)
 *G06K 9/00* (2006.01)
 *G06K 9/46* (2006.01)
 *G06T 7/60* (2017.01)
(52) U.S. Cl.
 CPC .................. *G06T 7/60* (2013.01); *G06T 7/70* (2017.01); *G06T 7/90* (2017.01); *H04N 1/387* (2013.01)

INFORMATION PROCESSING APPARATUS, INFORMATION PROCESSING SYSTEM, INFORMATION PROCESSING METHOD, AND PROGRAM

CROSS REFERENCE TO PRIOR APPLICATION

This application is a National Stage Patent Application of PCT International Patent Application No. PCT/JP2015/004356 (filed on Aug. 28, 2015) under 35 U.S.C. § 371, which claims priority to Japanese Patent Application No. 2014-174456 (filed on Aug. 28, 2014), which are all hereby incorporated by reference in their entirety.

TECHNICAL FIELD

The present technology relates to a technology of an information processing apparatus and the like that generates image data on the basis of geometric feature information acquired from original image data.

BACKGROUND ART

A technology in which original image data is captured, and image data including the original image data is generated and output has been known. For example, in the following Patent Literature 1, a technology in which data of an image picked up by a digital still camera is placed in a predetermined area of decoration image data (image data of an album page, etc.) prepared in advance to generate image data for output is disclosed.

CITATION LIST

Patent Literature

Patent Literature 1: Japanese Patent Application Laid-open No. 2009-268131

DISCLOSURE OF INVENTION

Technical Problem

In such a field, a technology that is capable of generating image data including the original image data, on which the geometric features of the original image data are reflected, is desired.

In view of the circumstances as described above, it is an object of the present technology to provide a technology that is capable of generating image data including the original image data, on which the geometric features of the original image data are reflected.

Solution to Problem

An information processing apparatus according to the present technology includes an acquisition unit and a generation unit.

The acquisition unit acquires geometric feature information extracted by analyzing first image data.

The generation unit generates second image data and third image data, the second image data being generated on the basis of the geometric feature information, the third image data including a first area and a second area, corresponding image data being placed in the first area, the corresponding image data corresponding to the first image data, the second image data being placed in the second area.

"The corresponding image data" may be image data of the first, image data itself, or image data obtained by adding some changes to the first image data, such as image data having a resolution different from that of the first image data.

This information processing apparatus generates the second image data on which the geometric features of the first image data are reflected, and the third image data including the corresponding image data corresponding to the first image data and the second image data. Accordingly, it is possible to generate the third image data including the original image data (the corresponding image data) on which the geometric features of the original image data (the first image data are reflected. Further, because the geometric features of the first image data are reflected on the second image data in the second area, this third image data provides an image with unity as a whole, which has a high designability.

In the information processing apparatus, the acquisition unit may acquire color information extracted by analyzing the first image data, and the generation unit may generate the second image data on the basis of the color information.

Accordingly, it is possible to further improve the designability in the third image data.

In the information processing apparatus, the acquisition unit may acquire a plurality of pieces of geometric feature information extracted from the first image data, and the generation unit may determine a priority for each of the plurality of pieces of geometric feature information, and generate the second image data on the basis of the geometric feature information selected on the basis of the priority.

In the information processing apparatus, the acquisition unit may acquire relevant information related to the first image data, and the generation unit may reflect, the relevant information on the second image data as text data.

Accordingly, it is possible to further improve the assignability in the third image data, and provide useful information to a user.

In the information processing apparatus, the second area may be located around the first area.

Accordingly, it is possible to further improve the designability in the third image data.

In the information processing apparatus, the generation unit may determine a position of the text data in the second image data on the basis of a position of a geometric feature in the second image data.

Accordingly, it is possible to further improve the designability in the third image data.

The information processing apparatus, the acquisition unit may acquire information on a gravity center position of the first image data acquired by analyzing the first image data, and the generation unit may determine positions of the first area and the second area on the basis of the gravity center position.

Accordingly, it is possible to further improve the designability in the third image data.

In the information processing apparatus, the acquisition unit may acquire information on a gravity center position of the first image data acquired by analyzing the first image data, and the generation unit may determine positions of the first area and the second area and a position of the text data in the second area on the basis of the gravity center position.

Accordingly, it is possible to further improve the designability in the third image data.

In the information processing apparatus, the acquisition unit may acquire feature information extracted, by analyzing the first image data, the feature information being different from the geometric feature information, and the generation unit may determine the number of pieces of geometric feature information to be reflected on the second image data on the basis of the feature information.

Accordingly, it is possible to reflect the appropriate number of geometric features on the second image data.

In the information processing apparatus, the acquisition unit may acquire relevant information related to the first image data, and the generation unit may determine the number of pieces of geometric feature information to be reflected on the second image data on the basis of the relevant information.

Accordingly, it is possible to reflect the appropriate number of geometric features on the second image data.

The information processing apparatus may further include an extraction unit that analyzes the first image data and extracts geometric feature information.

In the information processing apparatus, the extraction unit may analyze the first image data, extract feature information different from the geometric feature information, and determine the number or range of the number of pieces of geometric feature information to be extracted on the basis of the feature information.

Accordingly, it is possible to extract the appropriate number of geometric features from the first image data.

In the information processing apparatus, the acquisition unit may acquire relevant information related to the first image data, and determine the number or range of the number of pieces of geometric feature information to be acquired on the basis of the relevant information.

Accordingly, it is possible to extract the appropriate number of geometric features from the first image data.

In the information processing apparatus, the generation unit may reflect the geometric feature information on the corresponding image data.

Accordingly, it is possible to further improve the assignability in the third image data.

In the information processing apparatus, the acquisition unit may acquire processing rejection/acceptance information as relevant information related to the first image data, and the generation unit, may determine whether or not to reflect the geometric feature information on the corresponding image data on the basis of the processing rejection/acceptance information.

Accordingly, it is possible to appropriately determine whether or not to reflect the geometric features on the first image data.

In the information processing apparatus, the generation unit may analyze the first image data, determine whether or not the first image data includes the text data to be reflected on the second image, and change the size of the text data in the second image data depending on whether or not the first, image data includes the text data.

Accordingly, it is possible to appropriately change the size of the text data.

An information processing system according to the present technology include an analysis apparatus and a generation apparatus.

The analysis apparatus analyzes first image data and extracts geometric feature information from the first image data.

The generation apparatus acquires the geometric feature information and generates second image data and third image data the second image data being generated on the basis of the geometric feature information, the third image data including a first area and a second area, corresponding image data being placed in the first area, the corresponding image data corresponding to the first image data, the second image data being placed in the second area.

An information processing method according to the present technology includes:

acquiring geometric feature information extracted by analyzing first image data; and generating second image data on the basis of the geometric feature information; and generating third image data including a first area, and a second area, corresponding image data being placed in the first area, the corresponding image data corresponding to the first image data, the second image data being placed in the second area.

A program according to the present technology causes a computer to execute the steps of:

acquiring geometric feature information extracted by analyzing first, image data; and generating second image data on the basis of the geometric feature information; and generating third image data including a first area and a second area, corresponding image data being placed in the first area, the corresponding image data corresponding to the first image data, the second image data being placed in the second area.

Advantageous Effects of Invention

As described above, according to the present technology, it is possible to provide a technology that is capable of generating image data including the original image data, which reflects the geometric features of the original image data.

MODE(S) FOR CARRYING OUT THE INVENTION

Hereinafter, embodiments of the present technology will be described with reference to the drawings.

[Whole Configuration of Information Processing Apparatus and Configuration of Respective Units]

Figure 1:
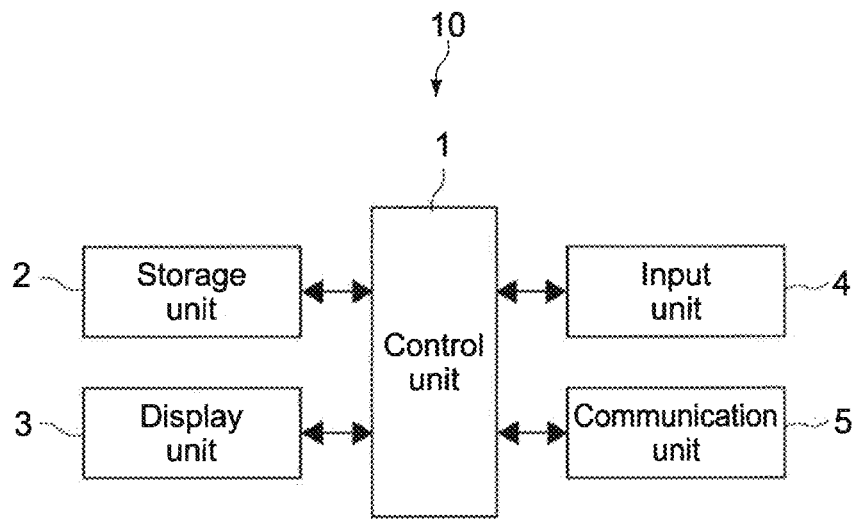
FIG. 1 A block diagram showing an electrical configuration of an information processing apparatus according to the present technology.

FIG. 1 is a block diagram showing an electrical configuration of an information processing apparatus 10 according to the present technology.

As shown in FIG. 1, the information processing apparatus 10 includes a control unit (an extraction unit, an acquisition unit, and a generation unit) 1, a storage unit 2, a display unit 3, an input unit 4, and a communication unit 5. Examples of this information processing apparatus 10 include a PC (Personal Computer), a game machine, a television receiver, a mobile phone (including a smartphone), a portable game machine, and a portable music player. However, it is not limited thereto.

The storage unit 2 includes a non-volatile memory (e.g., ROM (Read Only memory)) in which various programs necessary for processing performed by the control unit 1 are stored, and a volatile memory (e.g., RAM (Random Access Memory)) used as a working area of the control unit 1. The above-mentioned various programs may be read from a portable recording medium such as an optical disc and a semiconductor memory.

The display unit 3 includes, for example, a liquid crystal display or an EL display (EL: Electro Luminescence), and displays various images on a screen under the control of the control unit 1. The display unit 3 may be integrally formed with the information processing apparatus 10, or formed separately from the information processing apparatus 10 (especially, in the case where the information processing apparatus 10 is a PC or a game machine).

The input unit 4 inputs an instruction from a user, and outputs a signal depending on the user's instruction to the control unit 1. The input unit 4 includes, for example, a keyboard, a mouse, and the like. Further, the input unit 4 includes a touch sensor or the like provided, on the display unit 3. Note that in the case where the information processing apparatus 10 is a game machine or a portable game machine, the input unit 4 may be a controller for games. Further, in the case where the information processing apparatus 10 is a television receiver, the input unit 4 may be a remote controller for television.

The control unit 1 includes, for example, a CPU (Central Processing Unit). The control unit 1 performs various kinds of calculation on the basis of various programs stored in the storage unit 2, and collectively controls respective units of the information processing apparatus 10.

Specifically, the control unit 1 performs processing in which an original image data 11 (first image data, see FIG. 3) is analyzed and geometric features are extracted from the original image data 11. Further, the control unit 1 acquires the extracted geometric features, and generates background image data 12 (second image data, see FIG. 3) on which the geometric features are reflected. Then, the control unit 1 performs processing in which design image data 13 (third image data, see FIG. 3) including the original image data 11 (corresponding image data: the original image data itself or image data obtained by adding some changes such as a change in resolution or size, trimming processing, and color adjustment processing to the original image data) and the background image data 12 is generated.

Examples of the original image data 11 include image data of a song jacket, image data of a scene in a television program, and data of an image picked up by a digital still camera (not shown). Note that in this embodiment, the case where the original image data 11 is image data of a song jacket will be mainly described.

The communication unit 5 is configured to be capable of communicating with another apparatus such as a server apparatus on a network and a digital still camera. For example, the communication unit 5 communicates with a server apparatus on a network in response to an instruction from the control unit 1, and acquires image data of a song jacket or image data of a scene in a television program, or acquires relevant information (metadata) related to the image data, from the server apparatus. Note that in the case where the original image data 11 is a scene in a television program, image data and relevant information stored in a recorder that stores the television program may be used.

Further, the communication unit 5 communicates with a digital still camera in response to an instruction from the control unit 1, and acquires data of an image picked up by the digital still camera, or acquires relevant information (metadata) related to this image data. Note that in the case where data of an image picked up by a digital still camera is stored in a server apparatus on a network, the communication unit 5 may acquire image data and relevant information from the server apparatus on the network.

Note that examples of the relevant information include a song name, artist information (artist name, nationality, etc.) genre information (JAZZ, classic, rock, metal, etc.), tempo information (fast, slow), and reproduction time in the case where the original image data 11 is image data of a song jacket.

Further, in the case where the original image data 11 is image data of a scene in a television program, the relevant information is, for example, the name of the television program, names of the casts, or broadcasting time and date. Further, in the case where the original image data 11 is data of an image picked up by a digital still camera, the relevant information is, for example, a photographing time and date, a photographing place, or a shutter speed.

[Description of Operation]

Figure 2:
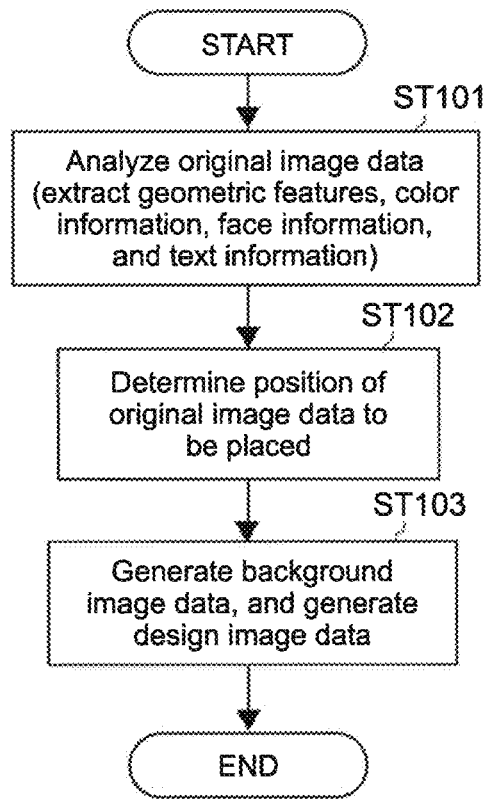
FIG. 2 A flowchart showing processing when design image data is generated from original image data.
Figure 3:
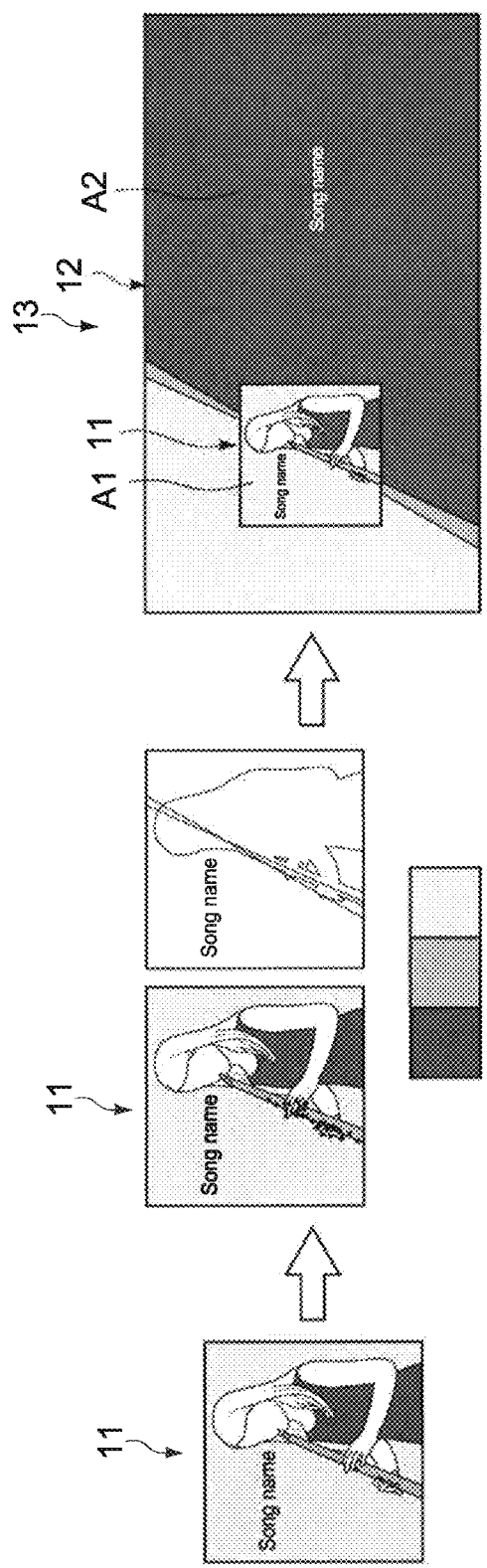
FIG. 3 A diagram showing the state where the design image data is generated from the original image data.

Next, processing of the information processing apparatus 10 will be described. FIG. 2 is a flowchart showing processing when the design image data 13 is generated from the original image data 11. FIG. 3 is a diagram showing the state where the design image data 13 is generated from the original image data 11. In FIG. 3, the state where the design image data 13 is generated from image data of a song jacket is shown.

Note that in the description of FIG. 2, description will be made on the assumption that the information processing apparatus 10 has already acquired the original image data 11 and the relevant information from a server apparatus, a digital still camera, or the like via the communication unit 5, and the original image data 11 and the relevant information have already been stored in the storage unit 2.

First, the control unit 1 starts processing shown in FIG. 2 at a predetermined timing. As the start timing of processing, various timings may be selected. Examples of the start timing include a timing at which the original image data 11 is acquired via the communication unit 5 and a timing at which an instruction from a user is input by the input unit 4.

As shown in FIG. 2, when the processing is started, first, the control unit 1 analyzes the original image data 11 and extracts geometric features, color information, face information, and text information from the original image data 11 (Step 101). Note that the geometric features represent a line, a circle, a circular arc, a polygon (combination of lines), and the like. Note that as the method of extracting the geometric features, Hough transform is used, for example.

The diagram on the left side of FIG. 3 shows an example of the original image data 11. This diagram shows image data of a jacket including an image in which a woman plays an instrument (clarinet) and the name of the song as an example.

Figure 4:
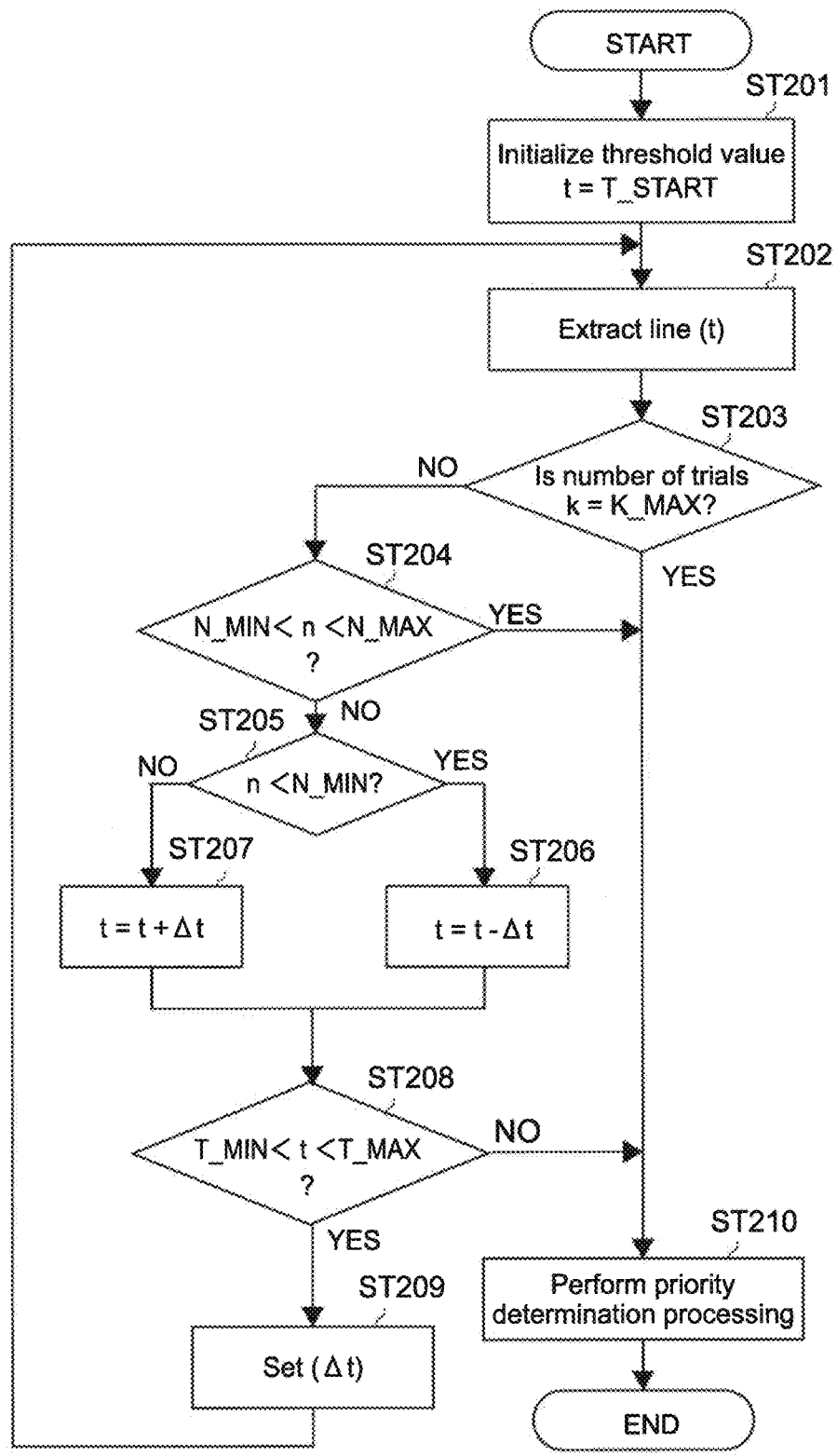
FIG. 4 A flowchart showing processing when geometric features are extracted.

FIG. 4 is a flowchart showing processing when geometric features are extracted. Note that in FIG. 4, processing in the case where a line is extracted as the geometric features is shown.

As shown in FIG. 4, first, the control unit 1 sets a threshold value (t) used for extracting a line to an initial value (T_START) (Step 201). When the threshold value (t) is set to this value, the control unit 1 extracts a line from the original image data 11 by using Hough transform (Step 202). In the Hough transform, a feature point is detected from the original image data 11 as pre-processing, and a line is extracted on the basis of the feature point. Note that as the above-mentioned pre-processing, processing of sharpening the edge by outline detection may be performed instead of the feature point detection.

With reference to FIG. 3, in the diagram on the left side of the center of FIG. 3, detected features points are represented by black dots. This diagram shows an example of the case where feature points are detected in the part corresponding to the instrument (clarinet) and the part corresponding to the hand playing the instrument. Note that in this diagram, only a part of detected features points is displayed for convenience of description.

Further, in the diagram on the right side of the center of FIG. 3, lines extracted by Hough transform are shown. This diagram shows an example of the case where two lines inclined at an angle corresponding to the inclination of the instrument (clarinet) are extracted at the position corresponding to the position of the instrument (clarinet).

With reference to FIG. 4 again, after extracting a line, the control unit 1 determines whether or not the current number of trials (k) of line extraction has reached a maximum value (K_MAX) of the number of trials (Step 203). In the case where the current number of trials (k) has reached the maximum value (K_MAX) of the number of trials (YES in Step 203), the control unit 1 proceeds to Step 210.

On the other hand, In the case where the current number of trials (k) has not reached the maximum, value (K_MAX) of the number of trials (NO in Step 203), the control unit 1 proceeds to Step 204. In Step 204, the control unit 1 determines whether or not the number (n) of extracted lines is larger than a minimum value (N_MIN: 2, for example) of the number of lines to be extracted and smaller than a maximum value (N_MAX: 10, for example) of the number of lines to be extracted. In other words, the control unit 1 determines whether or not the number (n) of extracted lines is within the range of numbers set in advance.

Note that the range of the number of lines to be extracted (that is, the values of N_MIN and N_MAX) may be determined on the basis of the value input by a user via the input unit 4, or determined on the basis of features different from geometric features, which are extracted from the original image data 11. Note that the features different from geometric features represent the spatial frequency, color distribution, and the like in the original image data 11.

In the case where the range of the number of lines to be extracted (that is, the values of N_MIN and N_MAX) is determined by a spatial frequency, color distribution, and the like, the control unit 1 analyzes the original image data 11 at a point before Step 204 is performed, and detects the spatial frequency, color distribution, and the like from the original image data 11.

Then, the control unit 1 sets the values of N_MIN and N_MAX so that the values of N_MIN and N_MAX are higher as the spatial, frequency is higher. Further, the control unit 1 sets the values of N_MIN and N_MAX so that the values of N_MIN and N_MAX are higher as the color distribution becomes more complex. Note that both the spatial frequency and the color distribution may be used, or one of them may be used.

Alternatively, the range of the number of lines to be extracted (that is, the values of N_MIN and N_MAX) may be determined on the basis of predetermined relevant information among relevant information (metadata) related to the original image data 11. In this case, for example, the control unit 1 determines the range of the number of lines to be extracted on the basis of genre information (JAZZ, classic, rock, metal, etc.) and tempo information (fast, slow).

Note that the design of image data of a song jacket is likely to be complex in the case where the genre is rock or metal as compared with the case where the genre is JAZZ or classic. Similarly, the design of image data of a song jacket is likely to be complex in the case where the tempo is fast as compared with the tempo is slow. Therefore, the range of the number of lines to be extracted is determined by using this relationship.

In this case, the control unit 1 sets the values of N_MIN and N_MAX so that the values of N_MIN and N_MAX are higher in the case where the genre is rock or metal as compared with the case where the genre is JAZZ or classic. Further, the control unit 1 sets the values of N_MIN and N_MAX so that the values of N_MIN and N_MAX are higher as the tempo is faster. Note that both the genre information and the tempo information may be used, or one of them may be used.

Note that the range of the number of lines to be extracted may be determined by using the features different from geometric features (spatial frequency and color distribution) and predetermined relevant information (genre information and tempo information).

With such processing, it is possible to extract the appropriate number of geometric features from the original image data 11.

Further, in the description herein, the case where the range of the number of lines to be extracted is determined on the basis of at least one of the features different from geometric features (spatial frequency and color distribution) and predetermined relevant information (genre information and tempo information) has been described. On the other hand, not the range of the number of lines to be extracted but the number of lines to be extracted may be determined on the basis of at least one of the features different from geometric features (spatial frequency and color distribution) and predetermined relevant information (genre information and tempo information).

In the case where, in Step 204, the number (n) of extracted lines is within the range of numbers set in advance (YES in Step 204), the control unit 1 proceeds to the next Step 210. On the other hand, in the case where the number (n) of extracted lines is not within the range of numbers set in advance (NO in Step 204), the control unit 1 determines whether or not the number (n) of extracted lines is smaller than the minimum, value (N_MIN) of the number of lines to be extracted (Step 205).

In the case where the number (n) of extracted lines is smaller than the minimum value (N_MIN) of the number of lines to be extracted (YES in Step 205), the control unit 1 decreases the current threshold value (t) by a predetermined value (Δt) (Step 206). On the other hand, in the case where the determination performed in Step 205 is negative (NO in Step 205), that is, the number (n) of extracted lines is larger than the maximum value N_MAX) of the number of lines to be extracted, the control unit 1 increases the current threshold value (t) by the predetermined amount (Δt) (Step 207).

When the threshold value (t) is decreased or increased by the predetermined amount (Δt), then, the control unit 1 determines whether or not the threshold value (t) is larger than a minimum value (T_MIN) of the threshold value and smaller than a maximum value (T_MAX) of the threshold value (Step 208). In other words, the control unit 1 determines whether or not the threshold value (t) is within the range of threshold values set in advance.

In the case where the threshold value (t) is not within the range of threshold values set in advance (NO in Step 208), the control unit 1 proceeds to Step 210. On the other hand, in the case where the threshold value (t) is within the range of threshold values set in advance (YES in Step 208), the control unit 1 sets the change amount (Δt) of the threshold value (Step 209).

Note that the change amount (Δt) of the threshold value is set as follows. First, in the case where the number (n) of lines is smaller than N_MIN at the previous trial and the number (n) of lines is smaller than N_MIN at the current trial, the control unit 1 sets the change amount (Δt) of the current threshold value to the same value as the change amount of the previous threshold value (or value larger than the previous value).

Similarly, in the case where the number (n) of lines is larger than N_MAX at the previous trial and the number (n) of lines is larger than N_MAX at the current trial, the control unit 1 sets the change amount (Δt) of the current threshold value to the same value as the change amount of the previous threshold value (or value larger than the previous value).

Note that the first change amount (Δt) of the threshold value is set to a value that is large to some extent.

Further, in the case where the number (n) of lines is smaller than N_MIN at the previous trial and the number (n) of lines is larger than N_MAX at the current trial, the control unit 1 sets the change amount (Δt) of the current threshold value to a value smaller than the change amount of the previous threshold value.

Similarly, in the case where the number (n) of lines is larger than N_MAX at the previous trial and the number (n) of lines is smaller than N_MIN at the current trial, the control unit 1 sets the change amount (Δt) of the current threshold value to a value smaller than the change amount of the previous threshold value.

With such processing, it is possible to quickly cause the number (n) of lines to converge within the range of the number of lines to be extracted.

As described above, in the case where the current trials (k) has reached the maximum value (K_MAX) of the number of trials (YES in Step 203), the number in) of extracted lines is within the range of numbers set in advance (YES in Step 204), or the threshold value (t) is not within the range of threshold values set in advance (NO in Step 208), the control unit 1 proceeds to Step 210.

In Step 210, the control unit 1 acquires the extracted line, and performs processing of determining the priority on this line. The following indexes are used to determine the priority.

(1) Distance from an Image Center to a Line

The shorter the distance from the image center to the line is, the higher the priority is.

(2) Slope of a Line

Inclined lines have higher priority than vertical and horizontal lines.

(3) Degree of Similarity to Another Line

The degree of similarity is determined by the slope of the line and the like. In the case where there are a plurality of similar lines (e.g., there are a plurality of vertical lines), the priority of one line is increased and the priority of the other lines is decreased.

(4) Intersection with a Characteristic Area Such as a Face and a Character

The priority of the line that intersects with a characteristic area such as a face and a character is decreased.

In the processing of determining the priority, the control unit 1 may use all of the (1) to (4) above to determine the priority, or may use a part of the (1) to (4) above to determine the priority.

In FIG. 4, although the case where a line is extracted from the original image data 11 has been described, it is possible to extract a circle, a circular arc, and a polygon (combination of lines) by using the similar processing.

With reference to FIG. 2 again, in step 101, not only the geometric features but also the color information is extracted by analyzing the original image data 11. Regarding the color information, all colors used in the original image data 11 may be extracted, or a part of the colors may be extracted. In the case where a part of the colors is extracted, the priority of the color is set so that the priority of the color is increased as the area of the color is larger. Further, the priority of achromatic colors such as black, white, and gray is set so that their priorities are lower than those of chromatic colors.

In the central diagram of FIG. 3, an example in which three colors of the color (e.g., blue) of the background, the color (e.g., red) of the cloth the woman wears, and the color (e.g., brown) of the clarinet in the original image data 11 are extracted is shown.

With reference to FIG. 2 again, in Step 101, the control unit 1 extracts face information, text information, and the like in addition to the geometric features and the color information from the original image data 11. Note that the face information is, for example, information on the area of a face or information on the central position of a face, and the text information is, for example, information on the character of text ("song name" in the example shown in FIG. 3), information on the area of text, and information on the central position of text.

Figure 5:
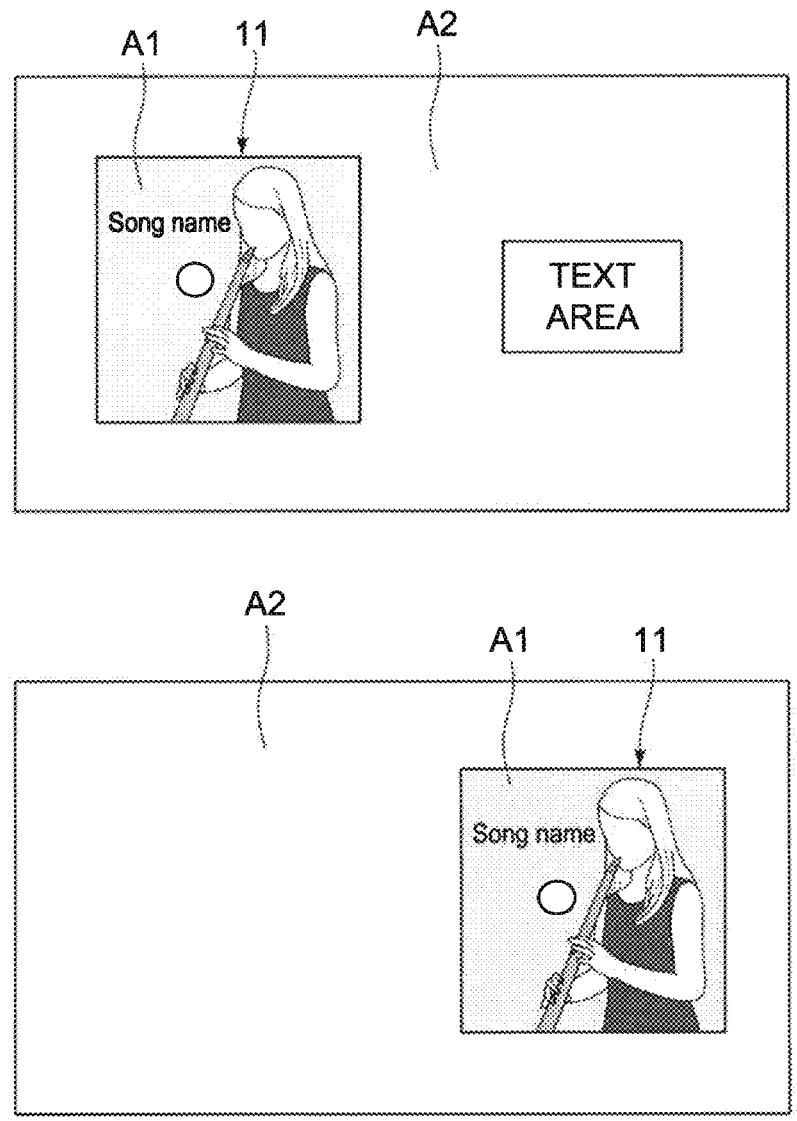
FIG. 5 A diagram showing the state where the original image data is placed in a predetermined frame.

When the analysis of the original image data 11 is finished, then, the control unit 1 determines the position of the original image data (corresponding image data) 11 to be placed in a predetermined frame (Step 102). FIG. 5 is a diagram showing the state where the original image data 11 is placed in a predetermined frame. On the upper side of FIG. 5, the state where text data is placed in a frame in addition to the original image data 11 is shown. On the other hand, in the diagram on the lower side of FIG. 5, the state where only the original image data 11 is placed in a frame is shown.

In the example shown in FIG. 5, the case where the frame has a rectangular shape is shown. However, the shape of the frame (shape of a second area) is not limited to a rectangular shape. For example, the shape of a frame may be a circular shape, an elliptical shape, a triangular shape, or a polygonal shape with five or more points.

Note that in the description of this embodiment, the area in which the original image data 11 is placed in a frame is referred to as a first area A1 and the other area, i.e., the area in which the background image data 12 is placed is referred to as a second area A2.

In Step 102, first, the control unit 1 determines the gravity center position in the original image data 11. In the determination of the gravity center position, at least one or more of the information on the area of a face, information on the central position of a face, information on the area of text, information on the central position of text, and information on the position of a feature point (see the black dots in the diagram on the left side of the center of FIG. 3) is used.

In the example shown in FIG. 5, the gravity center position in the original image data 11 is represented by a white circle. When the gravity center position is determined, the control unit 1 acquires information on the gravity center position and determines the position of the original image data 11 to be placed in a frame on the basis of the information (i.e., the positions of the first area A1 and the second area A2 are determined).

As shown on the upper side of FIG. 5, in the case where the original image data 11 and text data are placed, the control unit 1 places the original image data 11 in a frame on the side where the gravity center position is inclined in the original image data 11 (on the left side of the frame). Then, the control unit 1 places the text data in the frame on the side opposite to the side where the original image data 11 is placed (i.e., places the text data in a predetermined area in the second area A2).

Further, as shown on the lower side of FIG. 5, in the case where only the original image data 11 is placed, the control unit 1 places the original image data 11 in the frame on the side opposite to the side where the gravity center position is inclined in the original image data 11 (on the right side of the frame).

Accordingly, it is visually well-balanced, and the designability of the finally generated design image data 13 is improved.

Note that data placed in a frame as the text data is predetermined relevant information among the relevant information (metadata) related to the original image data 11. For example, the text data placed in a frame is a song name, an artist name, a genre name, and the like in the case where the original image data 11 is image data of a song jacket.

Further, in the case where the image data is image data of a scene in a television program, the text data placed in the frame is a program name, names of the casts, broadcasting time and date, and the like. Further, in the case where the image data is data of an image picked up by a digital still camera, the text data placed in the frame is a photographing time and date, a photographing place, and the like.

Note that in the example shown in FIG. 3, the case where a song name is used as the text data is shown.

With reference to FIG. 2 again, when the position of the original image data 11 (and the text data) to be placed is determined, then, the control unit 1 generates the background image data 12 on which the geometric features in the original image data 11 are reflected, and generates the design image data 13 including the original image data (corresponding image data) 11 and the background image data 12 (Step 103).

In Step 103, first, the control unit 1 selects a predetermined number of lines to be reflected on the background image data 12 from a plurality of lines extracted from the original image data 11. At this time, the control unit 1 performs processing of preferentially selecting a line having a high priority.

The number of lines to be reflected on the background image data 12 (the number of lines to be selected) may be determined on the basis of a value input by a user via the input unit or may be determined on the basis of features different from geometric features (spatial frequency and color distribution) extracted from the original image data 11.

In the case where the number of lines no be reflected on the background image data 12 is determined by a spatial frequency, color distribution, and the like, the control unit 1 sets the number of lines so that the number of lines to be reflected on the background image data 12 is increased as the spatial frequency is higher. Further, the control unit 1 sets the number of lines so that the number of lines to be reflected on the background image data 12 is increased as the color distribution becomes more complex. Note that both the spatial frequency and the color distribution may be used, or one of them may be used.

Alternatively, the number of lines to be reflected on the background image data 12 may be determined on the basis of predetermined relevant information among the relevant information (meta data) related to the original image data. In this case, for example, the control unit 1 determines the number of lines to be reflected on the background image data 12 on the basis of genre information (JAZZ, classic, rock, metal, etc.) and tempo information (fast, slow).

In this case, in the case where the genre is rock or metal, the control unit 1 sets the number of lines so that the number of lines to be reflected is larger than that in the case where the genre is JAZZ or classic. Further, the control unit 1 sets the number of lines so that the number of lines to be reflected is increased as the tempo is faster. Note that both the genre information and the tempo information may be used, or one of them may be used.

Note that the number of lines to be reflected on the background image data 12 may be determined by using features different from geometric features (spatial frequency and color distribution) and predetermined relevant information (genre information and tempo information).

With such processing, it is possible to cause a predetermined number of geometric features to be reflected on the background image data 12.

When a line is selected, then, the control unit 1 performs processing of causing the line to extend in the entire second area A2. In the diagram on the right side of FIG. 3, an example in which two lines extend in the second area A2 is shown. In this way, the background image data 12 on which geometric features of the original image data 11 are reflected is generated.

When a line is reflected on the background image data 12, then, the control unit 1 acquires the color information extracted from the original image data 11, and performs processing of filling in areas divided by the line on the basis of this information. Specifically, the control unit 1 performs processing of causing a color of the original image data 11 to be reflected on the background image data 12.

In the example shown in the diagram on the right side of FIG. 3, an example in which two narrow areas sandwiched by two lines are filled with the color (brown) of the clarinet is shown. Further, in this example, an example in which one of the other two areas is filled with the color (red) of the cloth the woman wears, and the other is filled with the color (blue) of the background of the original image data 11 is shown.

Note that which color is used for which area may be randomly determined, or may be determined taking into account the color in the original image data 11. For example, the most common color used in the areas of the original image data 11 may be used for the largest area in the second area A2. Note that the color extracted from the original image data 11 may be used for not only the area sandwiched by lines but also the outline of the line (the same shall apply to a circle and a circular arc).

With such processing, the design image data 13 including the original image data 11 and the background image data 12 is generated. Note that the design image data 13 shown in the diagram on the right side of FIG. 3 is used as a reproduction image displayed on the screen of the display unit 3 at the time of reproduction of music, for example.

Figure 6:
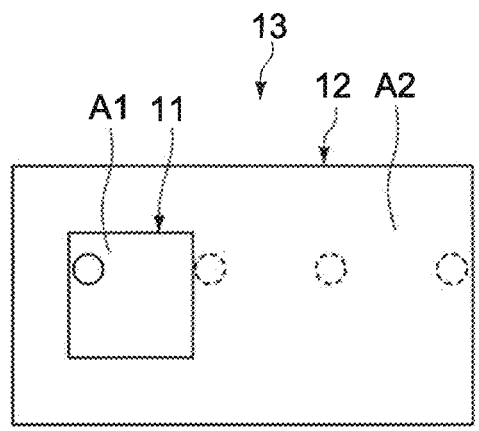
FIG. 6 A diagram for describing cases where a circle, a circular arc, and a combination of a circle and a line are extracted from the original image data as geometric features, and the geometric features are reflected on the background image data.
Figure 6:
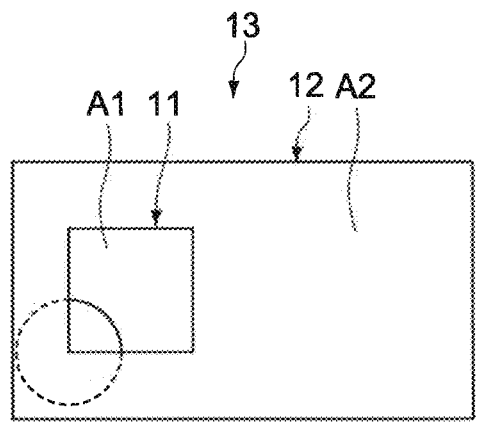
Figure 6:
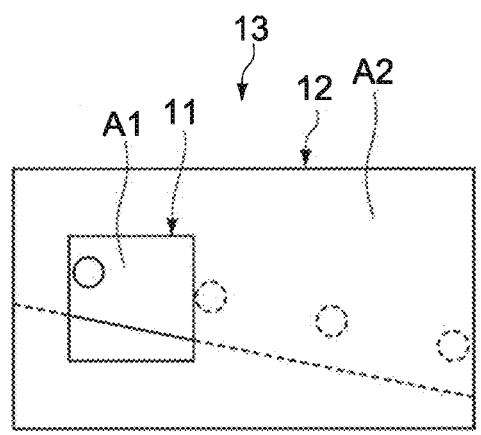

Now, the case where a circle, a circular arc, and a combination of a circle and a line are extracted from the original image data 11 as geometric features and the geometric features are reflected on the background image data 12 will foe described. FIG. 6 is a diagram for describing this.

With reference to the upper side of FIG. 6, in the case where a circle has been extracted, from the original image data 11 as geometric features, the control unit 1 places the circle in the second area A2 at predetermined intervals while maintaining the size of the circle.

With reference to the center of FIG. 6, in the case where a circular arc has been extracted from the original image data 11 as geometric features, the circular arc is caused to extend in the second area A2 to form the remaining part of the circular arc so that it becomes a circle as a whole.

With reference to the lower side of FIG. 6, in the case where a circle and a line have been extracted from the original image data 11 as geometric features, first, the control unit 1 causes the line to extend in the second area A2. Then, the control unit 1 places the circle in the second area A2 at predetermined, intervals so that, the placed circles are inclined at an angle depending on the slope of the line.

[Operation, Etc.]

As described above, the information processing apparatus 10 according to this embodiment is capable of generating the background image data 12 on which geometric features of the original image data 11 are reflected, and generating the design image data 13 including the original image data (corresponding image data) 11 and the background image data 12, Because the geometric features of the original image data 11 are reflected on the background image data 12 in the second area A2, the design image data 13 provides an image with unity as a whole, which has a high designability.

Further, the information processing apparatus 10 according to this embodiment is capable of further improving the designability of the design image data 13 because not only the geometric features of the original image data 11 but also the color of the original image data 11 is reflected on the background image data 12.

Further, the information processing apparatus 10 according to this embodiment places text data in the area of the background image data 12 (the second area A2). Accordingly, it is possible to not only improve the designability but also provide useful information to a user.

Various Modified Example

Figure 7:
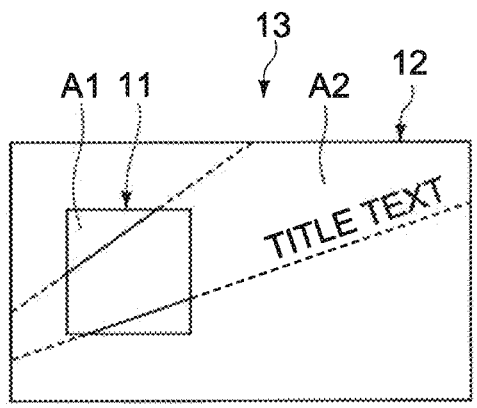
FIG. 7 A diagram showing the state where the position of text data in the background image data is determined on the basis of the position of the geometric features in the background image data.

Note that in the case where text data is placed in the area of the background image data 12, the control unit 1 may determine the position of the text data in the background image data 12 on the basis of the position of geometric features in the background image data 12. FIG. 7 is a diagram for describing this.

In the example shown in FIG. 7, an example in which two lines extend in the second area A2 is shown. Then, in this example, an example in which the text data is placed above one of the two lines along the line (in conformity with the slope of the line) is shown. In this example, the case where the position of the text data is determined in conformity with the position of the line is shown. However, the position of the text data may be determined in conformity with the position of a circle or a circular arc.

In the above-mentioned example, the case where the geometric features extracted from the original image data 11 are reflected only on the background image data 12, and the geometric features are not reflected on the original image data (corresponding image data) 11 has been described. On the other hand, geometric features may be reflected on the original image data (corresponding image data) 11. Accordingly, it is possible to further improve the designability of the design image data 13.

Figure 8:
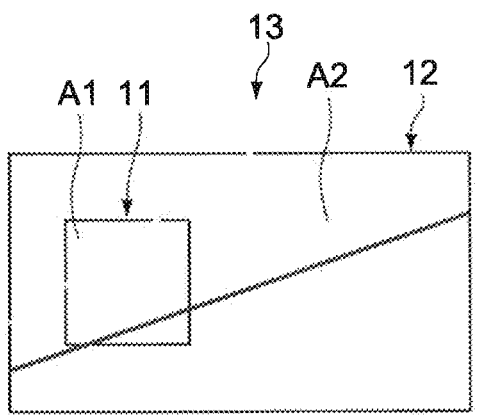
FIG. 8 A diagram showing an example of the case where the geometric features are reflected also on the original image data.

FIG. 8 is a diagram showing an example of the case where geometric features are reflected also on the original image data 11. In the example shown in FIG. 8, an example in which two lines are extracted from the original image data 11, and the two lines are overwritten with the original image data 11 is shown. Note that in the example shown in FIG. 8, an example in which the color detected from the original image data 11 is used for the two overwritten lines is shown.

Note that, performing the above-mentioned overwriting (processing) on, for example, image data of a song jacket or image data of a scene in a television program say be a problem from a viewpoint of the right to maintain integrity in copyright, or the like.

In order to overcome this problem, the control unit 1 may acquire processing rejection/acceptance information as the relevant information (metadata) related to the original image data 11, and determine to cause geometric features to be reflected on the original first image data or not on the basis of the processing rejection/acceptance information. In this case, the control unit 1 performs the above-mentioned overwriting (processing) only when the processing is accepted.

Further, the control unit 1 may determine whether or not the original image data 11 includes text data to be reflected on the background image data 12, and change the size of the text data in the background image data 12 depending on whether or not the original image data 11 includes text data.

For example, in the case where text information (information on a character of text) is acquired when the original image data 11 is analyzed, the control unit 1 compares this text information with the text data (acquired from the relevant information) to be reflected on the background image data 12. When they match, the control unit 1 makes the size of the text data to be reflected on the background image data 12 relatively small. Alternatively, in this case, the control unit 1 does not place the text data in the background image data 12.

Figure 9:
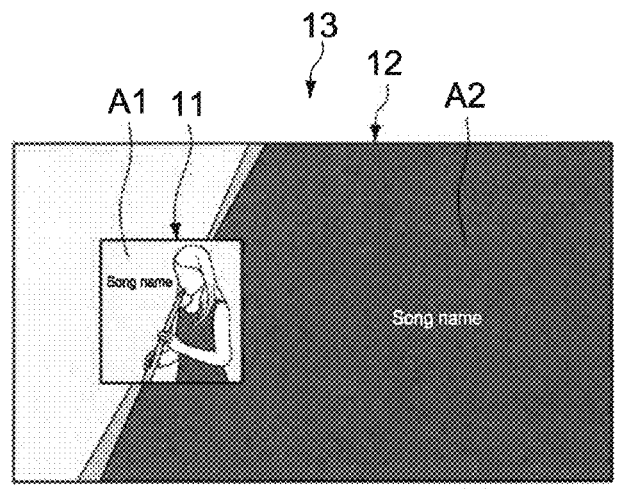
FIG. 9 A diagram showing an example of the cases where the size of the text data in the background image data is reduced and increased.
Figure 9:
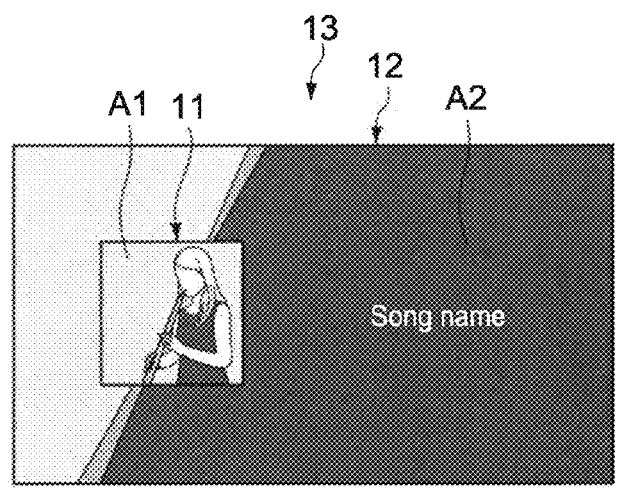

In the diagram on the upper side of FIG. 9, an example in which the size of the text data in the background image data 12 is made small is shown.

Further, in the case where the text information acquired from the original image data 11 and the text data (acquired from the relevant information) to be reflected on the background image data 12 do not match, or text information is not acquired because the original image data 11 does not include text information, the control unit 1 makes the size of the text data to be reflected on the background image data 12 relatively large.

In the diagram on the lower side of FIG. 9, an example in which the size of the text data in the background image data 12 is made large is shown.

Although the case where the text data to be reflected on the background image data 12 is acquired from the relevant information has been described in the above, this text data may be extracted from the original image data 11.

In the above description, the case where the area of the background image data 12 (the second area A2) is an area in the vicinity of the area in which the original image data 11 is placed (the first area A1) has been described. However, the second area A2 is not limited to the area in the vicinity of the first area A1. For example, the first area A1 and the second area A2 may be adjacent to each other in a vertical direction or a horizontal direction.

In the above description, the case where processing of analyzing the original image data 11 and extracting geometric features from the original image data 11 and processing of generating the background image data 12 and generating the design image data 13 including the original image data (corresponding image data) 11 and the background image data 12 are performed in the same apparatus has been described. On the other hand, these processing may be performed by separate apparatuses. Specifically, the present technology may be achieved by an information processing system including an analysis apparatus that analyzes the original image data 11 and extracts geometric features (or extracts information on a color, gravity center position, etc.), and a generation apparatus that acquires this information and generates the design image data 13.

Another Embodiment

Next, another embodiment of the present technology will be described.

In the above-mentioned embodiment, an example in which the generated design image data 13 is displayed on the display unit 3 (liquid crystal display or EL display) of the information processing apparatus 10 has been shown. However, the design image data 13 may be projected by a projector on an actual surface of a table, floor, wall, ceiling, and the like. In this case, as the original image data 11 as an extraction target of geometric features, an input image acquired from a camera that picks up an image of an actual object (e.g., placed on a table) may be used instead of image data stored in the storage unit 2 in advance. Further, the projection surface does not necessarily need to be a flat surface, and may be a curved surface, for example.

Specifically, in this embodiment, the technology that automatically generates a peripheral image with unity by extracting a color component and a graphic component on the basis of image analysis is expanded into the real world by using an input image acquired from a camera and an output image acquired from a projector. Hereinafter, the configuration and operation of an information processing system according to this embodiment will be described.

(Hardware Configuration of Information Processing System)

Figure 10:
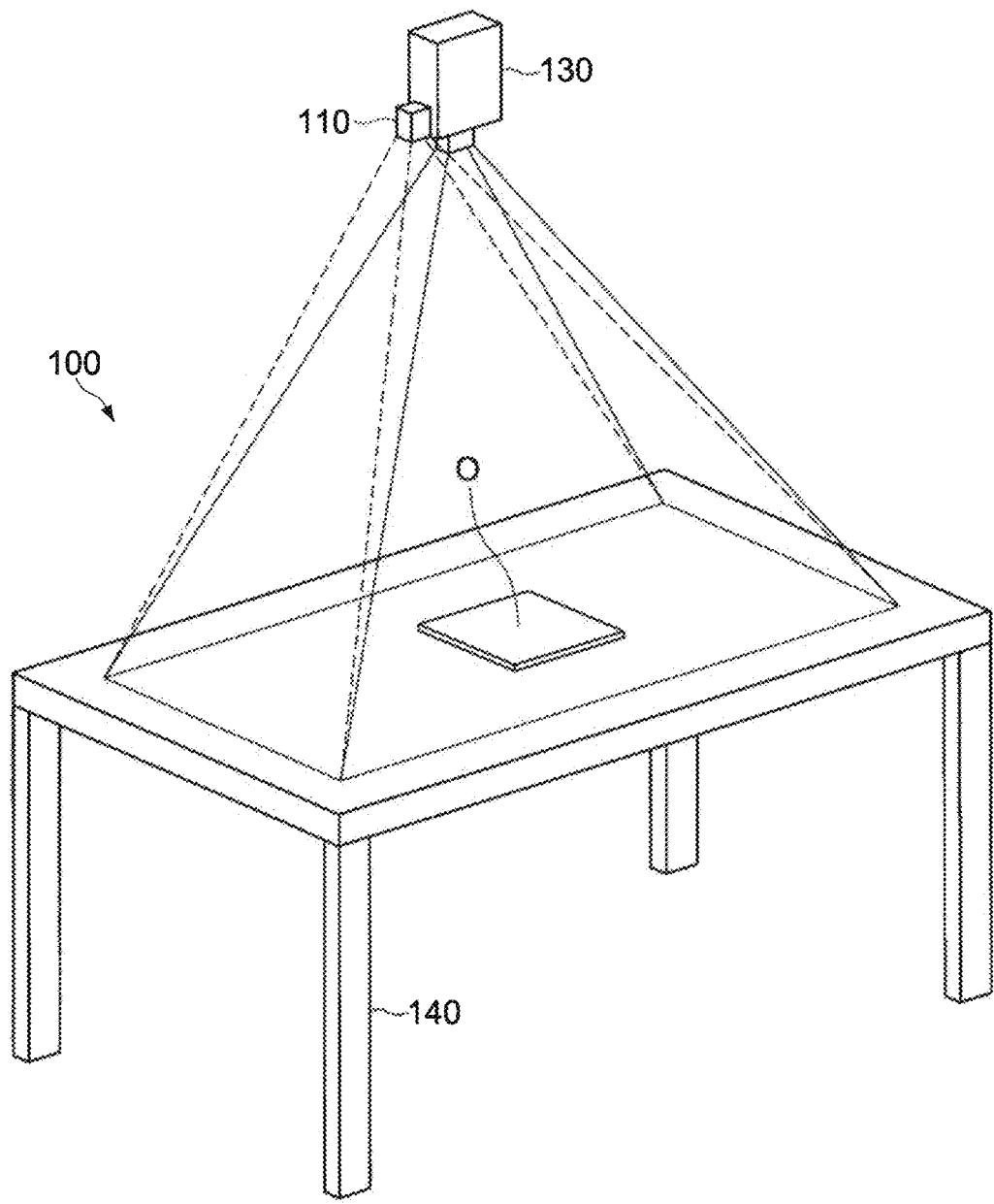
FIG. 10 A diagram showing the configuration of an information processing system according to another embodiment of the present technology.

FIG. 10 is a diagram, showing the configuration of the information processing apparatus system according to this embodiment. Note that the "system" may represent the configuration for performing predetermined processing, and the entire system may be regarded as one apparatus or it is also possible to regard that a plurality of apparatuses configure the system. Also the information processing system according to this embodiment shown in FIG. 10 only has to be configured to be capable of performing predetermined processing (e.g., processing achieved by the functional configuration shown in FIG. 11) as the entire information processing system, and which configuration in the information processing system is regarded as one apparatus may be arbitrarily determined.

As shown in the figure, an information processing apparatus system 100 according to this embodiment includes an input unit 110 and an output unit 130. The information processing system 100 projects information on the top surface of a table 140, and causes a user, who uses the information processing system 100, to operate the information projected on the table 140.

The input unit 110 is an apparatus that inputs the content of the operation performed by the user, who uses the information processing system 100, the shape or pattern of an object placed on the table 140, and the like. In the example shown in the figure, in the example shown in FIG. 10, the input unit 110 is provided above the table 140 in the state of being suspended from the ceiling, for example. Specifically, the input unit 130 is provided separately from the table 140 as a target on which information is displayed. As the input unit 110, a camera that picks up an image of the table 140 with a lens, a stereo camera that is capable of storing information on the depth direction by picking up an image of the table 140 with two lenses, a microphone for collecting sound emitted from the user, who uses the information processing system 100, or environmental sound, of the environment in which the information processing system 100 is placed, and the like can be used.

In the case where a camera that picks up an image of the table 140 with one lens is used as the input unit 110, the information processing system 100 is capable of detecting an object placed on the table 140 by analyzing an image picked up by the camera. Further, in the case where a stereo camera is used as the input unit 110, visible light camera, infrared ray camera, or the like can be used as the stereo camera. By using a stereo camera as the input unit 110, the input unit 110 is capable of acquiring depth information. Because the input unit 110 acquires the depth information, the information processing system 100 is capable of detecting the three-dimensional shape of an object O placed on the table 140, for example. That is, in this case, the input unit 110 functions also as a depth sensor.

Note that various things are supposed as the object O. Examples of the object O include a mobile phone, a CD (in a jacket case), a book, and a printed photograph.

Further, in the case where a microphone is used as the input unit 110, a microphone array for collecting sound in a particular direction can be used as the microphone. In the case where a microphone array is used as the input unit 110, the information processing system 110 may adjust the sound collection direction of the microphone array to an arbitrary direction.

The output unit 130 is an apparatus that displays information on the table 140 or outputs sound depending on information such as the content of an operation performed by a user, who uses the information processing system 100, the content of information output by the output unit 130, and the shape or pattern of an object placed on the table 140, which is input by the input unit 110. As the output unit 130, a projector or speaker is used, for example. In the example shown in FIG. 10, the output unit 130 is provided above the table 140 in the state of being suspended from the ceiling, for example. In the case where the output unit 130 is formed of a projector, the output unit 130 projects information on the top surface of the table 140. In the case where the output unit 130 is formed of a speaker, the output unit 130 outputs sound on the basis of an audio signal. In the case where the output unit 130 is formed of a speaker, the number of speakers may be one or two or more. In the case where the output unit 130 is formed of a speaker, the information processing system 100 may limit the speaker that outputs sound or adjust the direction for outputting sound.

Further, the output unit 130 may include an illumination device. In the case where the output unit 130 includes an illumination device, the information processing system 100 may control the state of the illumination device, e.g., turning on and off of the illumination device, on the basis of the content of information input by the input unit 110.

The user, who uses the information processing system 100, is capable of operating the information displayed on the table 140 by the output unit 130, by placing the finger or the like on the table 140. Further, by placing an object on the table 140 to cause the input unit 110 to recognize the object, the user is capable of performing various operations on the recognized object.

Although not shown in FIG. 10, another apparatus may be connected to the information processing system 100. For example, an illumination device for illuminating the table 140 may be connected to the information processing system 100. The information processing system 100 may control the lighting state of the illuminating device depending on the state of the display screen.

(Functional Configuration of Information Processing System)

Figure 11:
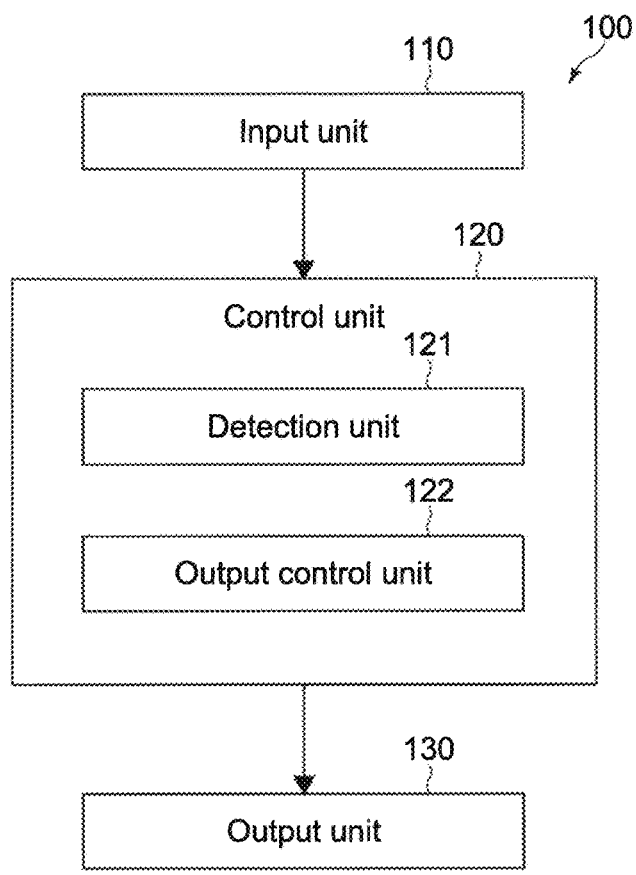
FIG. 11 A diagram showing a functional configuration example of the information processing system according to another embodiment of the present technology.

FIG. 11 is a diagram showing a functional configuration example of the information processing system according to this embodiment.

As shown in the figure, the information processing system 100 includes the input unit 110, a control unit 120, and the output unit 130.

The input unit 110 inputs the content of an operation performed on the information processing system 100 by a user, who uses the information processing system 100, the shape or pattern of an object placed on the surface (e.g., the table 140 in FIG. 10) on which the output unit 130 outputs information, and the like. The content of an operation performed on the information processing system 100 by a user, who uses the information processing system 100, includes content of an operation performed on a GUI (Graphical User Interface) output by the information processing system 100 on the display surface of information. Information such as the content of the operation performed on the information processing system 100 and the shape or pattern of an object, which is input by the input unit 110, is transmitted to the control unit 120.

The input unit 110 cars be formed of a camera including one lens, a stereo camera including two lenses, or a microphone, for example.

The control unit 120 controls the respective units of the information processing system 100. For example, the control unit 120 uses information input by the input unit 110 to generate information to be output from the output unit 130. As shown in the figure, the control unit 120 includes a detection unit 121 and an output control unit 122. The detection unit 121 detects the content of an operation performed on the information processing system 100 by a user of the information processing system 100, the content of information output by the output unit 130, the shape or pattern of the object O placed on the surface (e.g., the table 140) on which the output unit 130 outputs information, and the like. The content detected by the detection unit 121 is transmitted to the output control unit 122. The output control unit 122 generates information to be output from the output unit 130 on the basis of the content detected by the detection unit 121. The information generated by the output control unit 122 is transmitted to the output unit 130.

For example, by performing correction in advance so that the coordinate of the first area A1 on the display surface of information and the coordinate of the object O detected on the display surface match, the output control unit 122 is capable of generating the design image data 13 so that the object O is located at the first area A1 in the design image data 13 and the background image data 12 is projected in the vicinity thereof.

The control unit 120 may be formed of a CPU, for example. In the case where the control unit 120 is formed of an apparatus such as a CPU, the apparatus can be configured as an electronic circuit.

Further, although, not shown, the control unit 120 may have a communication function for performing wireless communication with another apparatus and a function of controlling the operation of another apparatus such as an illumination device connected to the information processing system 100.

The output unit 130 outputs information depending on information such as the content of an operation performed by a user of the information processing system 100, the content of information output by the output unit 130, and the shape or pattern of the object O placed on the surface (e.g., the table 140) on which the output unit 130 outputs information, which is input by the input unit 110. The output unit 130 outputs information on the basis of information generated by the output control unit 122. The information output by the output unit 130 includes information displayed on the display surface of information, sound output from a speaker or the like, and the like.

The information processing system 100 shown in FIG. 11 may be configured as a single apparatus, or a part or whole of the information processing system 100 may be formed of a separate apparatus. For example, the control unit 120 of the information processing system 100 shown in FIG. 11 may be provided to an apparatus such as a server connected to the input unit 110 and the output unit 130 via a network or the like. In the case where the control unit 120 is provided to an apparatus such as a server, information from the input unit 110 is transmitted to the apparatus such as a server via a network or the like, the control unit 120 processes the information from the input unit 110, and the information to be output from the output unit 130 is transmitted from the apparatus such as a server to the output unit 130 via the network or the like.

(Projection Example of Design Image Data)

Figure 12:
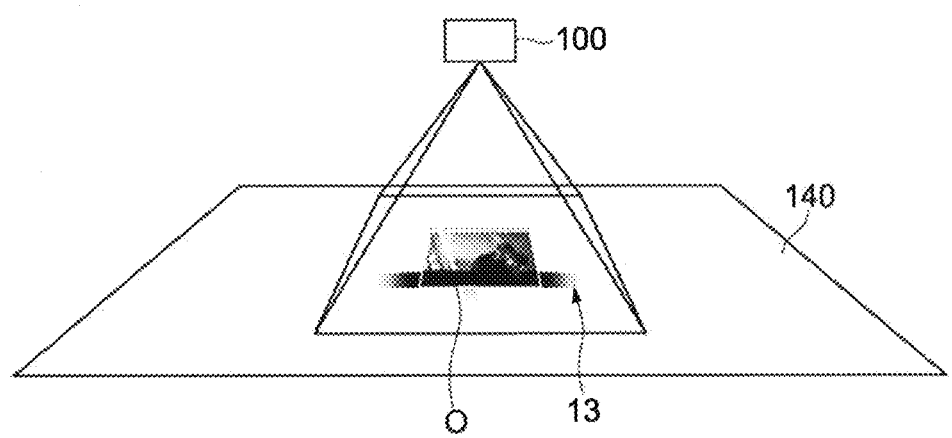
FIG. 12 A diagram showing an example of design image data projected in the information processing system according to another embodiment of the present technology.
Figure 13:
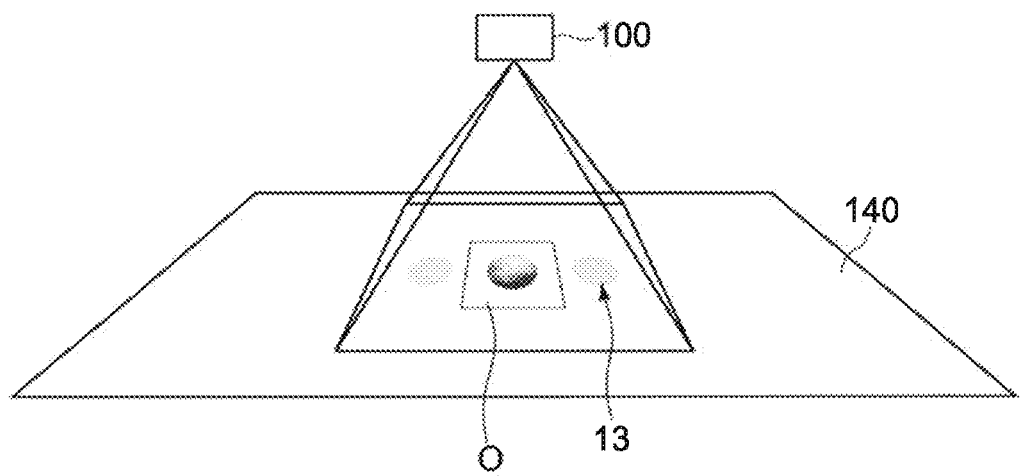
FIG. 13 A diagram showing an example of the design image data projected in the information processing system according to another embodiment of the present technology.

FIG. 12 and FIG. 13 are each a diagram showing an example of the design image data 13 projected on the table 140 or the like in the information processing system 100 in this embodiment.

In this embodiment, the first area A1 of the projected design image data 13 is generated so that the area of the first area A1 and the area of the object O match, and the original image data 11 does not necessarily need to be projected on the first area A1, making the first area A1 be a blank area. In other words, in this embodiment, the background image data 12 is generated from the original image data 11, and only the background image data 12 may be projected as the design image data 13.

As shown in FIG. 12, in the case where the object O is a CD case with a jacket, for example, geometric features and the like are extracted from the image of the CD jacket of the case, and the background image data 12 on which the geometric features are reflected is generated and projected in the vicinity of the object O on the table 140, similarly to the above-mentioned embodiment. In the example of the figure, lines in a horizontal direction and an oblique direction are extracted from the jacket image, and the background image data 12 including lines obtained by causing the lines to extend is projected in the vicinity of the object O on the basis of the features.

As shown in FIG. 13, also in the case where the object O is a printed photograph, for example, the background image data 12 on which geometric features extracted from the printed photograph are reflected is generated and projected in the vicinity of the object O. In the example of the figure, a circle is extracted from the printed photograph, and the background image data 12 including two circles arranged on both sides of the circle of the printed photograph is projected in the vicinity of the object O on the table 140 on the basis of the features.

In FIG. 12 and FIG. 13, an example in which the design image data 13 is projected on the table 140 has been shown. However, the surface on which the design image data 13 is projected may be a floor, wall (surface perpendicular to a floor), ceiling, or the like.

(Overview of Operation of Information Processing System)

Next, the operation of the information processing system according to this embodiment will be described.

Figure 14:
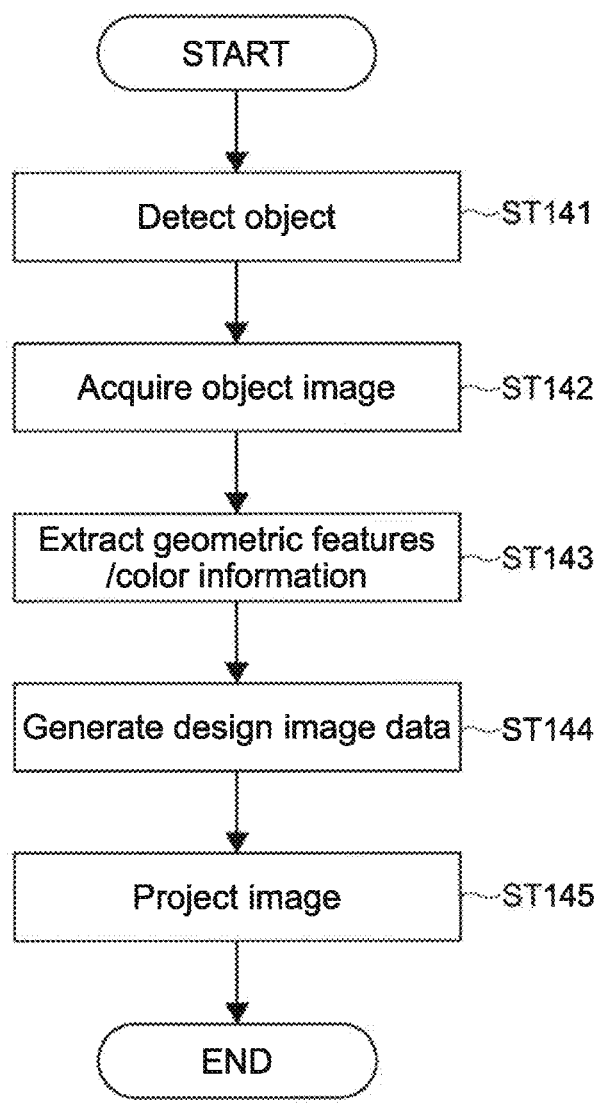
FIG. 14 A flowchart showing flow of projection processing on the design image data by the information processing system according to another embodiment of the present technology.

FIG. 14 is a flowchart showing flow of the operation of the information processing system.

As shown in the figure, the control unit 120 the object O from an input image of a camera (Step 141). Specifically, the control unit 120 compares a background image of the table 140 or the like, which has been picked up and stored in advance, with the input image of the input unit 110 (camera) to perform background difference processing, and detects the area of the object O as outline.

Next, the control unit 120 acquires an image of the object O from the input image from which the object O is detected (Step 142).

Next, the control unit 120 analyzes the acquired image of the object O, and extracts geometric features and color information (Step 143). This extraction processing is similar to the processing in the above-mentioned embodiment.

Next, the control unit 120 generates the design image data 13 on the basis of the extracted geometric features and color information (Step 144). In this design image data 13, the detected area of the object O (the first area A1) is made blank (black color), and the background image data 12 is placed in the vicinity thereof. In the case where the background image data 12 is for example, such a graphic or line as is extended from the geometric features of the image of the object O, the first area A1 is generated so as to match with the shape and area of the area including the object O so that the continuity between the pattern or the like of the object O and the background image data 12 is ensured, and the background image data 12 is generated from the edge portion (boundary with the second area A2) of the first area A1 to the vicinity thereof.

Then, the control unit 120 brings the generated design image data 13 into alignment by the output unit 130 so that the area of the object O on the table 140 or the like overlaps the blank area, and then, projects it in the vicinity of the object O (Step 145).

(Specific Example 1 of Projection Control: Emphatic Display on Object)

In the above-mentioned example, an example in which data in which the area corresponding to the detected object O (the first area A1) is made blank (black color) is output as the design image data 13 has been described. However, some kind of image data may be projected also on the area, corresponding to the object O of the design image data 13.

For example, an image may be generated in the area corresponding to the object O of the design image data 13 and projected so as to overlap the geometric features on the object O so that the geometric features (graphic or line) that are detected from the object O and used for generating the background image data 12 are emphatically displayed on the object O.

Figure 15:
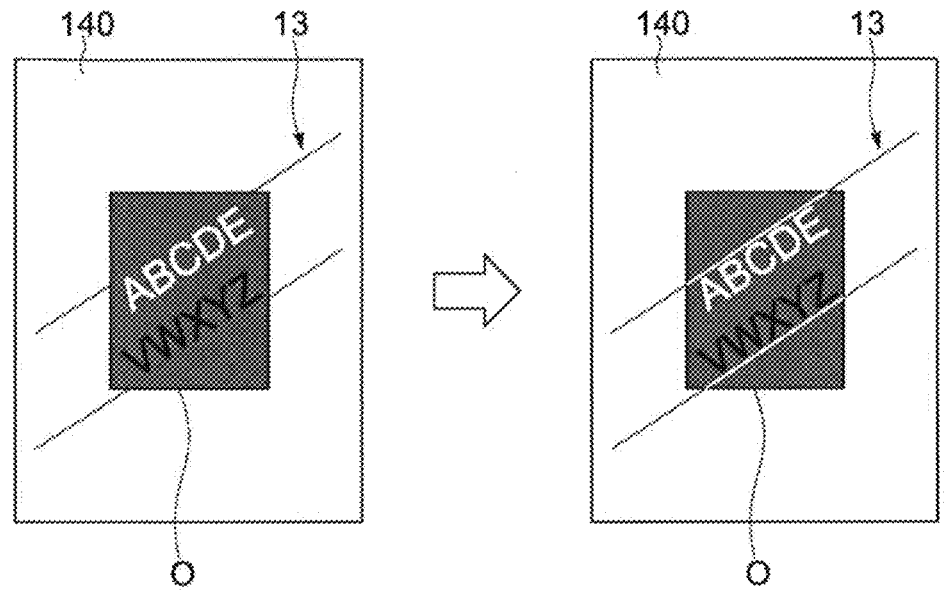
FIG. 15 A diagram showing an example of the design image data projected in the information processing system according to another embodiment of the present technology.

FIG. 15 is a diagram showing an example of such emphatic display.

The diagram on the left side of the figure shows an example of the design image data 13 in which the area corresponding to the object O is made blank, which includes only the background image data 12 in the vicinity thereof. In the example of the figure, the object O is a book and alphabets are printed on the cover of the book on two rows in an oblique direction. The control unit 120 detects the oblique direction of the alphabets, generates the background image data 12 including lines in the oblique direction corresponding thereto and the design image data 13 including a blank area corresponding to the area of the object O, and projects the design image data 13 so that the lines are continuously displayed from the object O.

On the other hand, the diagram on the right side of the figure shows an example of the design image data 13 including an image also on the area corresponding to the object O. As shown in the figure, image data including lines that overlap the lines of the background image data 12 in the oblique direction is generated in the area corresponding to the object O, and the design image data 13 obtained by combining the image data and the background image data 12 is projected.

Note that the lines in image data projected on the area of the object O may be appropriately changed depending on the color of the object O. For example, in the case where the color of the table 140 is a white-based color, the color of the lines in the oblique direction in the background image data 12 is a black-based color. On the other hand, in the case where the color of the object O (cover of the book) is a black-based color, the color of the lines in the oblique direction in the image of the area corresponding to the object O may be a white-based color.

By generating an image that emphasizes the geometric features detected from the object O also in the area corresponding to the object O, and projecting it to be superimposed on the object O as described above, what geometric features are recognized from the object O is made clear for the user.

Further, in the case where the image of the detected object O is a copyable image such as a CD jacket image, the control unit 120 may search the information processing system 100 or a database on an external network for the same image as the image of the object O acquired from the input unit 110, which has high image quality, and place the image in the area of the object O before combining it with the background image data 12 to generate the design image data 13 and projecting it to be superimposed on the object O.

(Specific Example 2 of Projection Control: Expression depending on Height/Thickness of Object)

In the above-mentioned example, in the case where the object O has a certain height/thickness, the control unit 120 is capable of providing expression in which a graphic looks as if it is the same height as the object O for the user, by projecting the graphic and line on which the geometric features extracted from the object O are reflected together with (a graphic or line looks like) shadow thereof in the design image data 13.

In this case, the control unit 320 detects also the height/thickness of the object O by the stereo camera (depth sensor) or the like as the input unit 110 at the time of the detection of the object O, and adjusts the offset amount of shadow depending on the height/thickness.

Figure 16:
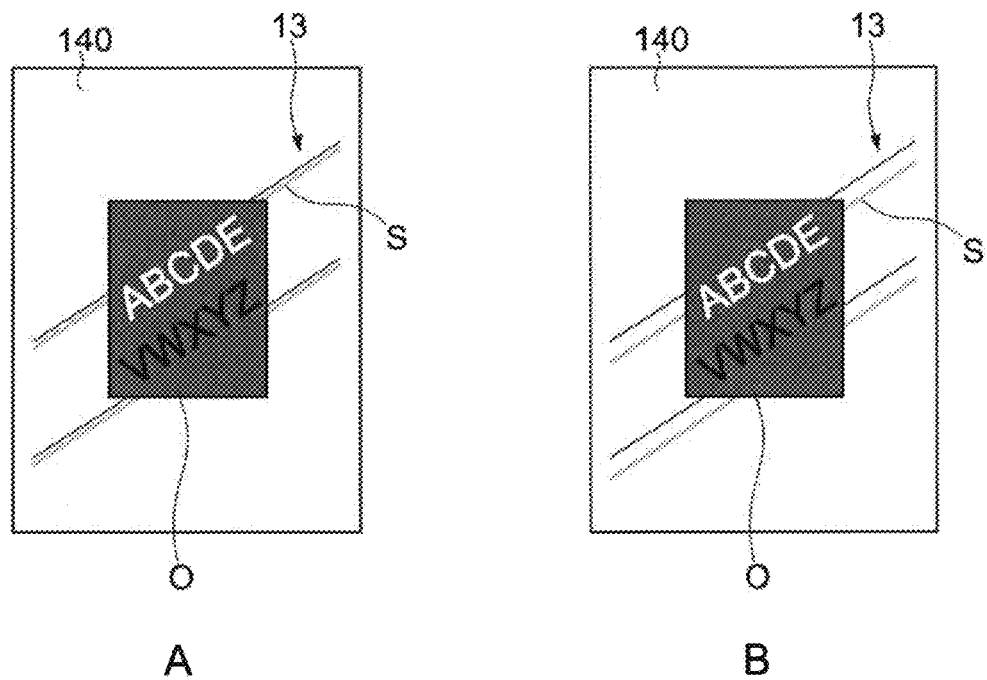
FIG. 16 A diagram showing an example of the design image data projected in the information processing system according to another embodiment of the present technology.

FIG. 16 is a diagram showing an example of the design image data 13 including such a shadow graphic.

Part A of the figure shows an example of the design image data 13 including shadow, which is projected on the object O having a relatively small thickness (height), and part B of the figure shows an example of the design image data 13 including shadow, which is projected on the object O having a relatively large thickness (height).

As shown in the figure, both diagrams are the same in that the design image data 13 including oblique lines on which the geometric features (alphabets described obliquely) on the surface of the object O are reflected is projected. However, it can be seen that the distance between the line and a shadow line S projected therebelow is large in the design image data in part B of the figure as compared with the design image data 13 in part A of the figure. Because the distance between the line and the shadow line S in the design image data 13 in both diagrams reflects the height/thickness of the object O, the user is capable of knowing the height/thickness of the object O by this distance.

(Specific Example 3 of Projection Control: Projection Example on Complex Three-dimensional Object)

In the above-mentioned example, in the case where the detected object O is a three-dimensional object with a relatively complex shape, the control unit 120 may perform detection processing using an image picked up from a direction perpendicular to the projection surface. In this case, the control unit 120 may use a vertical surface such as a wall as the projection surface instead of a horizontal surface such as the table 140 and a floor.

Further, in this case, the control unit 120 may perform, as necessary, background removal or the like of the projection surface as pre-processing by using a depth sensor or the like. Specifically, in the case where it has been detected that there is a color or pattern that blocks the visibility of the design image data 13 on the projection surface such as a wall surface, the control unit 120 may project an image that cancels the color or pattern prior to the projection of the design image data 13.

On the contrary, the control unit 120 may actively use information on texture of the surface from which the object O has been detected to perform processing of projecting the design image data 13. Specifically, for example, in the case where a seam of a plate material or a tile has been detected, as the texture, from a picked-up image of a floor or wall as the projection surface, the control unit 120 may generate the design image data 13 and project it so that geometric features (e.g., line or grid) of the seam and the design image data 13 are visible as design with unity.

Further, the control unit 120 may acquire the position of the user's viewpoint by a camera or the like different from the input unit 110, and perform correction at the time of projection so that the object O and a line or graphic in the projected design image data 13 look seamless from the position of the user's viewpoint.

Figure 17:
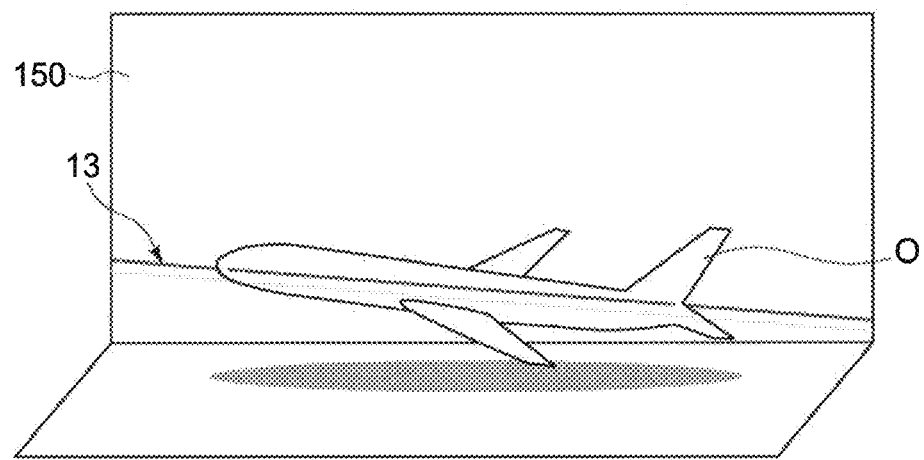
FIG. 17 A diagram showing an example of the design image data projected in the information processing system according to another embodiment of the present technology.

FIG. 17 is a diagram showing a projection example of the design image data 13 in the case where the object O is a complex three-dimensional object.

As shown in the figure, in the case where the object O is, for example, a model airplane suspended from the ceiling, the control unit 120 uses a wall 150 as the projection surface and takes an image of the object O from the direction perpendicular to the wall 150 by the input unit 110 to perform processing of detecting the object O.

When the control unit 120 detects, as geometric features, a line in a horizontal direction from the surface of the model airplane as the object O, for example, the control unit 120 generates the design image data 13 including a line like the line that is extended to the outside of the model airplane on the basis of the line, and projects it.

In this case, in the case where a pattern or the like that blocks the visibility of the line in the horizontal direction is detected from the wall 150, the control unit 120 performs cancelling processing thereon as pre-processing. Further, the control unit 120 may separately detect the position of the user's viewpoint and correct the position of the line on the design image data 13 to be projected so that the line on the design image data 13 and the line on the model airplane look seamless from the position of the user's view point.

(Specific Example 4 of Projection Control: Projection Example in Case where there is Plurality of Objects)

In the above-mentioned example, a projection example in which one object O is detected has been shown. However, a plurality of objects O may be detected, and the design image data 13 depending on the plurality of objects O may be generated and projected.

For example, the control unit 120 may newly use the area formed by intersection points of lines detected from the plurality of objects O to generate the design image data 13.

Figure 18:
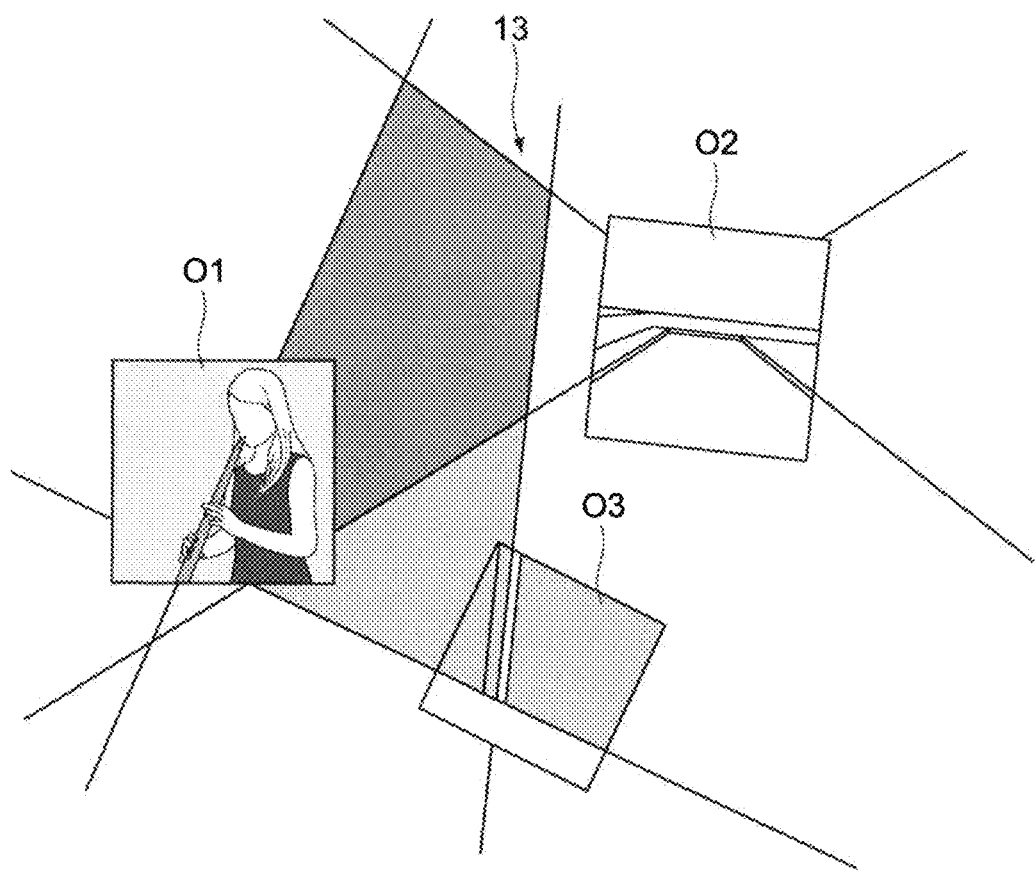
FIG. 18 A diagram showing an example of the design image data projected in the information processing system according to another embodiment of the present technology.

FIG. 18 is a diagram showing a projection example of the design image data 13 in the case where the plurality of objects O are detected.

As shown in the figure, in the case where three CD jacket cases have been detected as the object O, for example, the control unit 120 may cause a plurality of lines extracted from the picked-up images of the CD jacket cases to intersect with each other, generate the design image data 13 having a plurality of areas that are surrounded by the lines and expressed with different colors, and project it. Specifically, in this case, each of the areas corresponding to objects O1, O2, and O3 (the first area A1) is generated as a blank (block color) area, for example, and the area in the vicinity thereof (the second, area A2) is generated as the background image data 12 including the plurality of lines and the plurality of areas surrounded thereby. Further, the colors of areas of the plurality of areas surrounded by the plurality of lines, which are close to the objects O1, O2, and O3, may be set to colors similar to the respective colors detected from the objects.

Further, in this case, the control unit 120 may give a priority to the detected plurality of objects O, and generate the design image data 13 depending on the priority. For example, the control unit 120 may give a priority to the plurality of objects O depending on their areas or the distance from the center of the imaging range of the input unit 110, and preferentially use the geometric features extracted front the object O that has the larger area or is closer to the center, for example, depending on the priority, to generate the design image data 13.

(Another Projection Control Example)

In the above-mentioned example, typically, the color of the design image data 13 is set to a color similar to a color detected from the object O. However, the control unit 120 may change the color of the design image data 13 depending on the color of the surface (the table 140, the wall 150, floor, ceiling, etc.) from which the object O is detected. For example, in the case where a white color is detected from the object O and the color of the surface on which the object O is placed is also a white color, the design image data 13 with a white color is made less visible. Therefore, the color of the design image data 13 may be set to a color other than a white color. Further, in the case where the color detected from the object O is a black color of a dark color, the color of the design image data 13 may be set to a light color regardless of the color of the surface from which the object O has been detected, because a projector is hard to project a black color. Further, from a similar viewpoint, in the case where a dark (black-based) color and a light color are detected from the object O, the light color may be preferentially used to generate the design image data 13.

In the above-mentioned example, a gradation color based on the color detected from the object O may be used for the design image data 13. In particular, regarding a projection image projected by a projector, the design image data 13 generated by using such a gradation effect that the projected area is more faded out as being closer to the end portion thereof provides a more natural image for the user. For example, in the case where the projection surface such as the table 140 is used as a GUI by a plurality of users in the information processing system 100, the projection surface may be divided into operation areas (windows) for the plurality of users, and the design image data 13 projected on the windows may be more faded out as being closer to the vicinity of the boundary.

In the above-mentioned example, an example in which the design image data 13 comes close to the area of the object O and is projected from the end portion thereof to look seamless has been shown. However, the design image data 13 does not necessarily need to come close to the object O to be objected. For example, the design image data 13 may be projected at a position away from the object O by a predetermined distance.

In the above-mentioned example, in the case where movement of the object O has been detected from the picked-up image of the input unit 110, the control unit 120 may make processing of projecting the design image data 13 follow the movement of the object O. In this case, the control unit 120 may perform the follow processing in real-time, or periodically perform the follow processing at a predetermined frame rate. Further, in the case where the movement of the object O has been detected, the control unit 120 does not project the design, image data 13 during the movement, and may project the design image data 13 again at the position after the movement when it has been detected that the object O moves and gets still again.

In the above-mentioned example, the control unit 120 may use not only the geometric features of the detected object O but also information on the surrounding user to generate the design image data 13. For example, in the case where a plurality of line segments have been, detected from the object O, the control unit 120 may detect the position of a user around the projection surface such as the table 140 with another sensor such as a camera, and use the line segment that faces the direction of the user to generate the design image data 13. Further, in the case where text data (e.g., song title) is placed in the design image data 13 as shown in FIG. 7 or FIG. 9 in the above-mentioned embodiment, the text data may be placed at a position close to the position of the user in the design image data 13. In the case where the text data of the song title functions as a GUI for reproducing a song, the user inputs an operation (tapping with the finger, etc.) on the song title projected in the vicinity of himself/herself, the control unit 120 detects it, and thus, the song can be reproduced.

Note that the design image data 13 functions as a GUI and can be used for interaction with a user, which is not limited to this embodiment and shall apply to the above-mentioned embodiment. Specifically, the design image data 13 displayed on the display unit 3 of the information processing apparatus 10 in the above-mentioned embodiment may function as a GUI.

In the above-mentioned example, in the case where predetermined conditions are satisfied, the control unit 120 may regulate the performance of the processing of generating the design image data 13 and the processing of projecting the design image data 13. For example, because it is hard to project a black-based color by a projector, as described above, the control unit 120 may analyze the color component (histogram) or the color extracted from the object O, and does not need to perform the generation processing and projection processing in the case where it is the color component (intensity or saturation has a value less than a predetermined value) of a black-based color (e.g., monochrome document), and may perform the generation processing and projection processing in the case where the intensity or saturation has a value not less than the predetermined value. Further, the control unit 120 may analyze the depth (three-dimensional shape) of the detected object O, and does not need to perform the generation processing and projection processing similarly also in the case where it is a complex three-dimensional shape (e.g., the distribution of the depth value is not less than a predetermined value).

In the above-mentioned example, a projection example of the design image data 13 in the case where the object O is a CD case, book, photograph, or the like, has been shown. However, the design image data 13 can be generated similarly even in the case where the object O is any other things. For example, in the case where a dish (put on a plate and placed on a table) offered to customers in a restaurant is detected as the object O, the design image data 13 may be projected in the vicinity of the dish on the table as presentation on the basis of the geometric features of the dish.

It should be noted that the present technology may take the following configurations, (1) An information processing apparatus, including:
an acquisition unit that acquires geometric feature information extracted by analyzing first image data; and a generation unit that generates second image data and third image data, the second image data being generated on the basis of the geometric feature information, the third image data including a first area and a second area, corresponding image data being placed in the first area, the corresponding image data corresponding to the first image data, the second image data being placed in the second area.

(2) The information processing apparatus according to (1) above, in which the acquisition unit acquires color information extracted by analyzing the first image data, and the generation unit generates the second image data on the basis of the color information.

(3) The information processing apparatus according to (1) or (2) above, in which the acquisition unit acquires a plurality of pieces of geometric feature information extracted from the first image data, and the generation unit determines a priority for each of the plurality of pieces of geometric feature information, and generates the second image data on the basis of the geometric feature information selected on the basis of the priority.

(4) The information processing apparatus according to any one of (1) to (3) above, in which the acquisition unit acquires relevant information related to the first image data, and the generation unit reflects the relevant information on the second image data as text data.

(5) The information processing apparatus according to any one of (1) to (4) above, in which the second area is located around the first area.

(6) The information processing apparatus according to (4) above, in which the generation unit determines a position of the text data in the second image data on the basis of a position of a geometric feature in the second image data.

(7) The information processing apparatus according to any one of (1) to (6) above, in which the acquisition unit acquires information on a gravity center position of the first image data acquired by analyzing the first image data, and the generation unit determines positions of the first area and the second area on the basis of the gravity center position.

(8) The information processing apparatus according to (4) above, in which the acquisition unit acquires information on a gravity center position of the first image data acquired by analyzing the first image data, and the generation unit determines positions of the first area and the second area and a position of the text data in the second area on the basis of the gravity center position.

(9) The information processing apparatus according to any one of (1) to (8) above, in which the acquisition unit acquires feature information extracted by analyzing the first image data, the feature information being different from the geometric feature information, and the generation unit determines the number of pieces of geometric feature information to be reflected on the second image data on the basis of the feature information.

(10) The information processing apparatus according to any one of (1) to (9) above, in which the acquisition unit acquires relevant information related to the first image data, and the generation unit determines the number of pieces of geometric feature information to be reflected on the second image data on the basis of the relevant information.

(11) The information processing apparatus according to any one of (1) to (10) above, further including an extraction unit that analyzes the first image data and extracts geometric feature information.

(12) The information processing apparatus according to (11) above, in which the extraction unit analyzes the first image data, extracts feature information different from the geometric feature information, and determines the number or range of the number of pieces of geometric feature information to be extracted on the basis of the feature information.

(13) The information processing apparatus according to (11) or (12) above, in which the acquisition unit acquires relevant information related to the first image data, and determines the number or range of the number of pieces of geometric feature information to be acquired on the basis of the relevant information.

(14) The information processing apparatus according to any one of (1) to (13) above, in which the generation unit reflects the geometric feature information on the corresponding image data.

(15) The information processing apparatus according to (14) above, in which the acquisition unit acquires processing rejection/acceptance information as relevant information related to the first image data, and the generation unit determines whether or not to reflect the geometric feature information on the corresponding image data on the basis of the processing rejection/acceptance information.

(16) The information processing apparatus according to (4) above, in which the generation unit analyzes the first image data, determines whether or not the first image data includes the text data to be reflected on the second image, and changes the size of the text data in the second image data depending on whether or not the first image data includes the text data.

(17) An information processing system, including:

an analysis apparatus that analyzes first image data and extracts geometric feature information from the first image data; and a generation apparatus that acquires the geometric feature information and generates second image data and third image data, the second image data being generated on the basis of the geometric feature information, the third image data including a first area and a second area, corresponding image data being placed in the first area, the corresponding image data corresponding to the first image data, the second image data being placed in the second area.

(18) An information processing method, including:

acquiring geometric feature information extracted by analyzing first image data; and generating second image data on the basis of the geometric feature information; and generating third image data including a first area and a second area, corresponding image data being placed in the first area, the corresponding image data corresponding to the first image data, the second image data being placed in the second area.

(19) A program that causes a computer to execute the steps of:

acquiring geometric feature information extracted by analyzing first image data; and generating second image data on the basis of the geometric feature information; and generating third image data including a first area and a second area, corresponding image data being placed in the first area, the corresponding image data corresponding to the first image data, the second image data being placed in the second area.

REFERENCE SIGNS LIST 1,120 control unit
10 information processing apparatus
11 original image data
12 background image data
13 design image data
110 input unit
130 output unit

The invention claimed is:

1. An information processing apparatus, comprising:
an acquisition unit configured to acquire geometric feature information extracted by analyzing first image data; and
a generation unit configured to generate second image data and third image data, the second image data being generated on the basis of the geometric feature information, the third image data including a first area and a second area, corresponding image data being placed in the first area, the corresponding image data corresponding to the first image data, the second image data being placed in the second area,
wherein the acquisition unit and the generation unit are each implemented via at least one processor.

2. The information processing apparatus according to claim 1, wherein
the acquisition unit is further configured to acquire color information extracted by analyzing the first image data, and
the generation unit is further configured to generate the second image data on the basis of the color information.

3. The information processing apparatus according to claim 1, wherein
the acquisition unit is further configured to acquire a plurality of pieces of geometric feature information extracted from the first image data, and
the generation unit is further configured to determine a priority for each of the plurality of pieces of geometric feature information, and generate the second image data on the basis of the geometric feature information selected on the basis of the priority.

4. The information processing apparatus according to claim 1, wherein
the acquisition unit is further configured to acquire relevant information related to the first image data, and
the generation unit is further configured to reflect the relevant information on the second image data as text data.

5. The information processing apparatus according to claim 1, wherein
the second area is located around the first area.

6. The information processing apparatus according to claim 4, wherein
the generation unit is further configured to determine a position of the text data in the second image data on the basis of a position of a geometric feature in the second image data.

7. The information processing apparatus according to claim 1, wherein the acquisition unit is further configured to acquire information on a gravity center position of the first image data acquired by analyzing the first image data, and
the generation unit is further configured to determine positions of the first area and the second area on the basis of the gravity center position.

8. The information processing apparatus according to claim 4, wherein
the acquisition unit is further configured to acquire information on a gravity center position of the first image data acquired by analyzing the first image data, and
the generation unit is further configured to determine positions of the first area and the second area and a position of the text data in the second area on the basis of the gravity center position.

9. The information processing apparatus according to claim 1, wherein
the acquisition unit is further configured to acquire feature information extracted by analyzing the first image data, the feature information being different from the geometric feature information, and
the generation unit is further configured to determine the number of pieces of geometric feature information to be reflected on the second image data on the basis of the feature information.

10. The information processing apparatus according to claim 1, wherein
the acquisition unit is further configured to acquire relevant information related to the first image data, and
the generation unit is further configured to determine the number of pieces of geometric feature information to be reflected on the second image data on the basis of the relevant information.

11. The information processing apparatus according to claim 1, further comprising
an extraction unit configured to analyze the first image data and extract geometric feature information,
wherein the extraction unit is implemented via at least one processor.

12. The information processing apparatus according to claim 11, wherein
the extraction unit is further configured to analyze the first image data, extract feature information different from the geometric feature information, and determine the number or range of the number of pieces of geometric feature information to be extracted on the basis of the feature information.

13. The information processing apparatus according to claim 11, wherein
the acquisition unit is further configured to acquire relevant information related to the first image data, and determine the number or range of the number of pieces of geometric feature information to be acquired on the basis of the relevant information.

14. The information processing apparatus according to claim 1, wherein
the generation unit is further configured to reflect the geometric feature information on the corresponding image data.

15. The information processing apparatus according to claim 14, wherein
the acquisition unit is further configured to acquire processing rejection/acceptance information as relevant information related to the first image data, and
the generation unit is further configured to determine whether or not to reflect the geometric feature information on the corresponding image data on the basis of the processing rejection/acceptance information.

16. The information processing apparatus according to claim 4, wherein the generation unit is further configured to analyze the first image data, determine whether or not the first image data includes the text data to be reflected on the second image, and change the size of the text data in the second image data depending on whether or not the first image data includes the text data.

17. An information processing system, comprising:

an analysis apparatus that analyzes first image data and extracts geometric feature information from the first image data; and a generation apparatus that acquires the geometric feature information and generates second image data and third image data, the second image data being generated on the basis of the geometric feature information, the third image data including a first area and a second area, corresponding image data being placed in the first area, the corresponding image data corresponding to the first image data, the second image data being placed in the second area, wherein the analysis apparatus and the generation apparatus are each implemented via at least one processor.

18. An information processing method, implemented via at least one processor, the method comprising:

acquiring geometric feature information extracted by analyzing first image data; and generating second image data on the basis of the geometric feature information; and generating third image data including a first area and a second area, corresponding image data being placed in the first area, the corresponding image data corresponding to the first image data, the second image data being placed in the second area.

19. A non-transitory computer-readable medium having embodied thereon a program, which when executed by a computer causes the computer to execute a method, the method comprising:

acquiring geometric feature information extracted by analyzing first image data; and generating second image data on the basis of the geometric feature information; and generating third image data including a first area and a second area, corresponding image data being placed in the first area, the corresponding image data corresponding to the first image data, the second image data being placed in the second area.

* * * * *